US009449020B2

(12) United States Patent
Lu et al.

(10) Patent No.: US 9,449,020 B2
(45) Date of Patent: Sep. 20, 2016

(54) METHOD FOR SMART CARD TO PROCESS CAP FILE

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD, Beijing (CN)

( * ) Notice: Subject to any disclaimer, the term of this patent is extended or adjusted under 35 U.S.C. 154(b) by 186 days.

(21) Appl. No.: 14/363,399

(22) PCT Filed: Oct. 31, 2012

(86) PCT No.: PCT/CN2012/083866
§ 371 (c)(1),
(2) Date: Jun. 6, 2014

(87) PCT Pub. No.: WO2013/097544
PCT Pub. Date: Jul. 4, 2013

(65) Prior Publication Data
US 2014/0324926 A1 Oct. 30, 2014

(30) Foreign Application Priority Data
Dec. 31, 2011 (CN) .......................... 2011 1 0460179

(51) Int. Cl.
G06F 17/30 (2006.01)
G06Q 20/34 (2012.01)
G06F 9/445 (2006.01)

(52) U.S. Cl.
CPC ......... *G06F 17/30218* (2013.01); *G06F 8/665* (2013.01); *G06F 17/30094* (2013.01); *G06Q 20/3552* (2013.01); *G06Q 20/3563* (2013.01); *G06Q 20/3576* (2013.01)

(58) Field of Classification Search
None
See application file for complete search history.

(56) References Cited

U.S. PATENT DOCUMENTS

2010/0332916 A1   12/2010   Fukuda et al.

FOREIGN PATENT DOCUMENTS

| CN | 1423867 A   | 6/2003  |
|----|-------------|---------|
| CN | 101097606 A | 1/2008  |
| CN | 101281610 A | 10/2008 |
| CN | 101401113 A | 4/2009  |
| CN | 101840332 A | 9/2010  |
| CN | 102184374 A | 9/2011  |
| CN | 102591735 A | 7/2012  |
| EP | 1207454 A1  | 5/2002  |

OTHER PUBLICATIONS

International Search Report dated Jan. 24, 2013 corresponding with PCT/CN2012/083866 with English translation, 4 pp.

*Primary Examiner* — Alex Gofman
*Assistant Examiner* — Umar Mian
(74) *Attorney, Agent, or Firm* — Ohlandt, Greeley, Ruggiero & Perle, LLP

(57) ABSTRACT

A method for a smart card to process a CAP file, including the following steps: a smart card establishing a connection with an external terminal, performing initialization, receiving an APDU command corresponding to a CAP file, storing the data contained in the APDU command in a communication cache area, judging the value of a first state flag bit of the card, and performing different operations with respect to the value of a different second state flag bit. The method for a smart card to process a CAP file provided herein can effectively utilize the storage resources of a smart card and improve the download speed of the CAP files and ensure the integrity of the contents in the CAP files and the smart card.

12 Claims, 11 Drawing Sheets

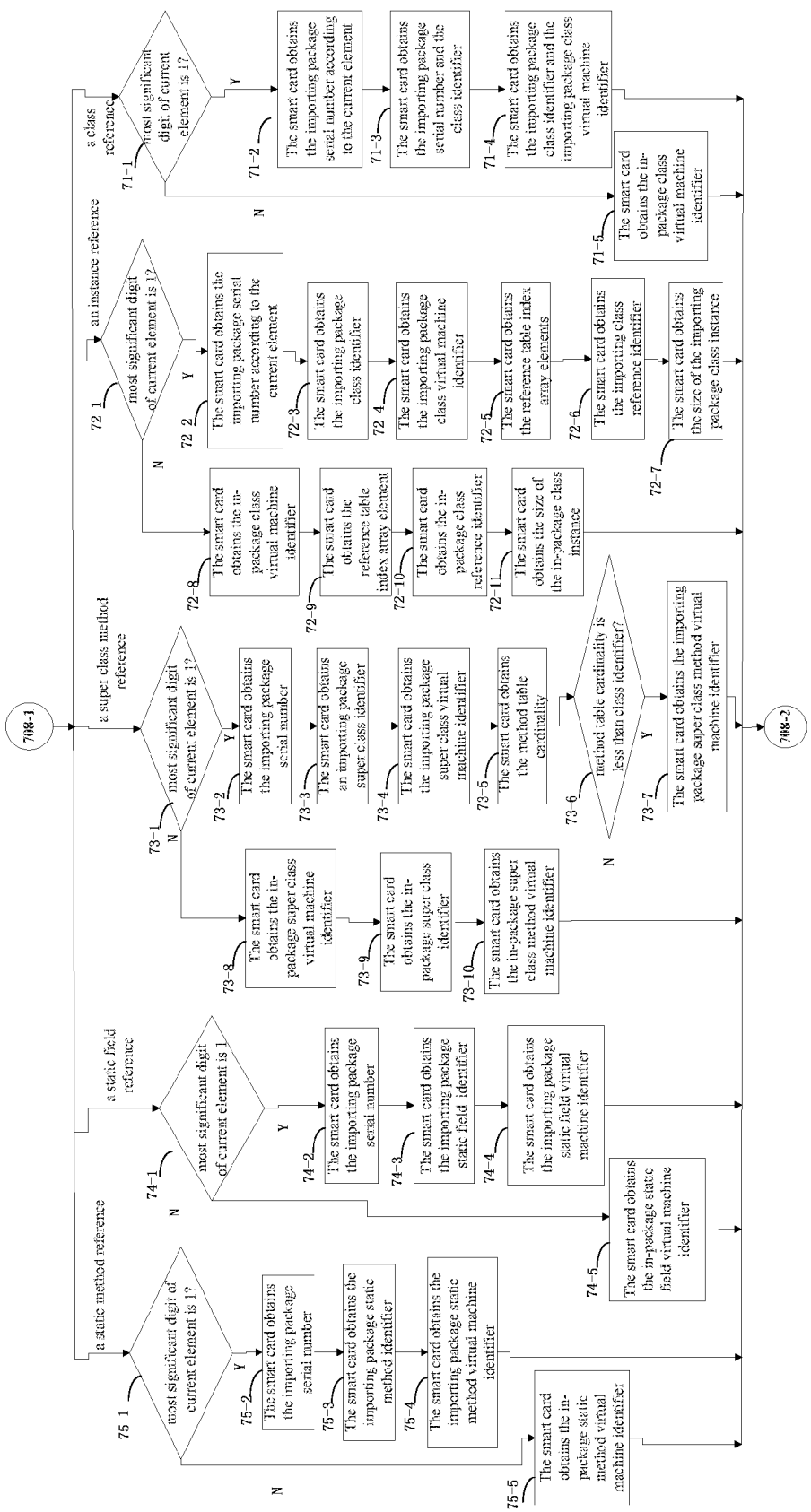
FIG. 7 (Continuation)

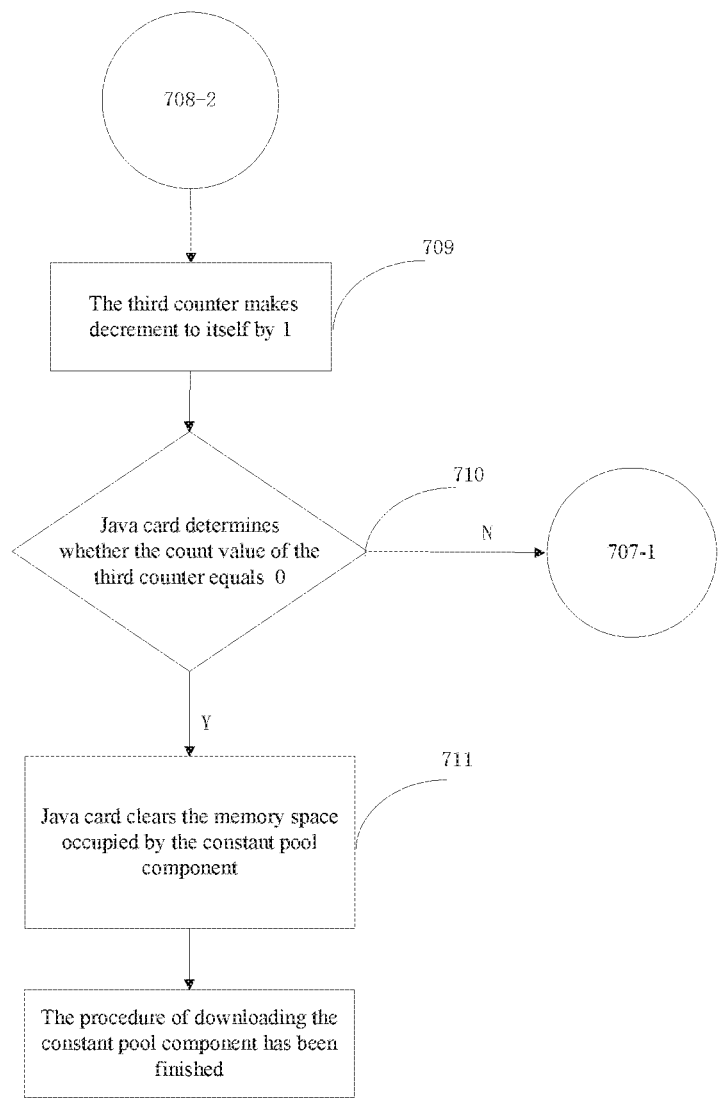
FIG. 7 (Continuation)

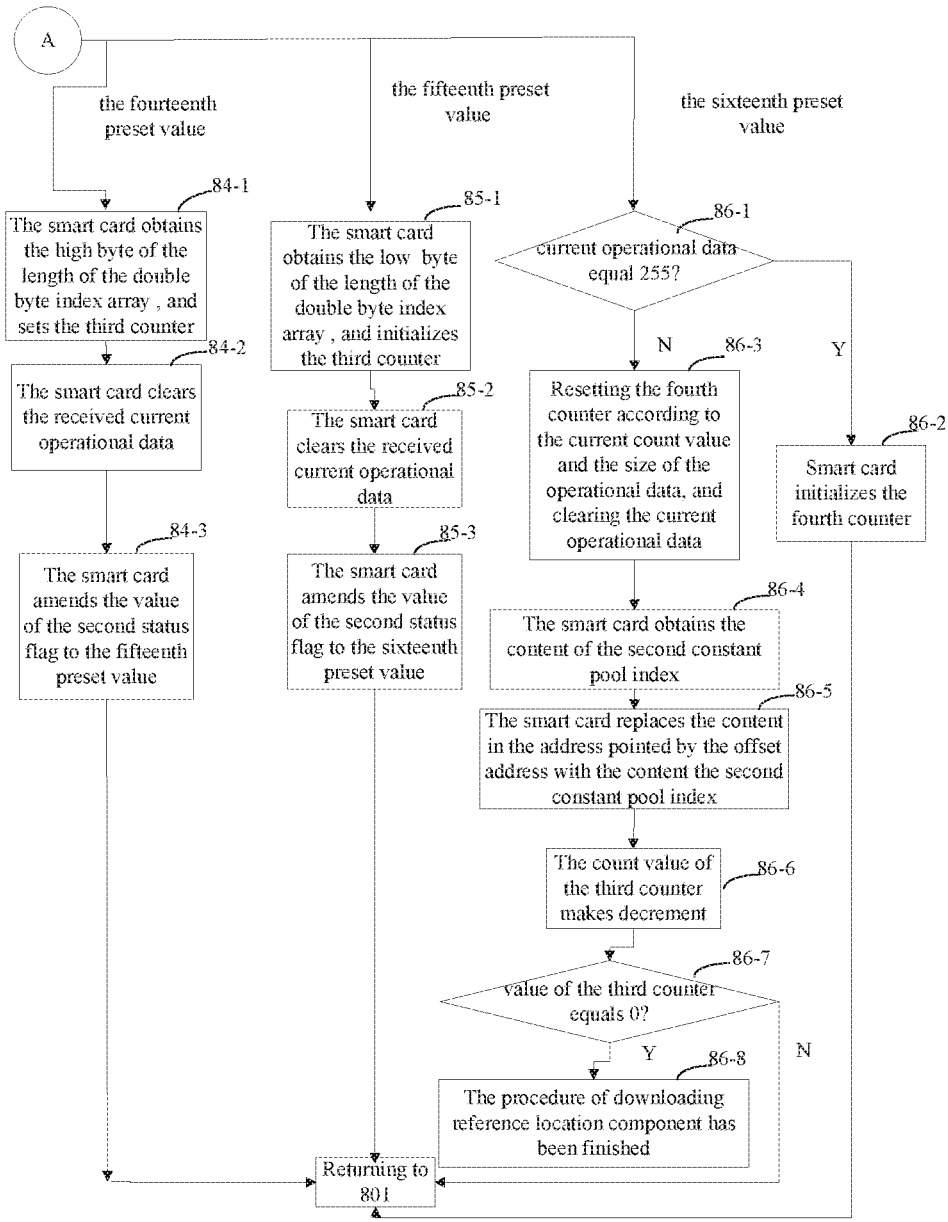
FIG. 8 (Continuation)

METHOD FOR SMART CARD TO PROCESS CAP FILE

This application claims priority to Chinese Patent Application No. 201110460179.5, entitled "METHOD FOR SMART CARD TO PROCESS CAP FILE", filed on Dec. 31, 2011 with State Intellectual Property Office of PRC, which is incorporated herein by reference in its entirety.

FIELD

The present invention relates to the field of the smart card, and more particularly, to a method for processing CAP documents by a smart card.

BACKGROUND

A smart card is a kind of card with a microchip embedded therein. At present, the technology of smart card is widely applied in many fields, such as identity identification, payment instruments, encryption/decryption, and information technology.

As the limited resources in a smart card platform, such as a Java card virtual machine platform, a smart card cannot store class documents directly. Before imported into a smart card device, Java program should be changed via a converting device to a special document format, which is a zip document with a suffix of CAP, for the smart card.

Conventionally, in specification for processing CAP documents by the smart card, there is no method for processing data of components in CAP documents according to characteristics of each component, but storing the unprocessed CAP documents into the smart card directly. Nevertheless, disadvantages of the method are: occupying too many resources in the smart card, increasing cost of memory management, slowing-down CAP documents downloading, and failing to ensure integrity of CAP documents.

SUMMARY

To use less storage space when a smart card downloads and parses CAP documents, and to enhance CAP documents downloading speed and ensure integrity of CAP documents during the downloading and parsing, the present disclosure provides a method for processing a CAP document by a smart card.

A method for processing a CAP document by a smart card, includes:

A. establishing a connection between the smart card and an external terminal and initializing;

B. receiving, by the smart card, an APDU command corresponding to the CAP document, and storing the data comprised in the APDU command into communication buffer;

C. determining, by the smart card, the value of the first status flag in the smart card, executing step D in a case that the value is a first preset value; executing step E in a case that the value is a second preset value; executing step F in a case that the value is a third preset value; executing step G in a case that the value is a fourth preset value; executing step H in a case that the value is a fifth preset value; executing step I in a case that the value is a sixth preset value; executing step J in a case that the value is a seventh preset value; executing step K in a case that the value is an eighth preset value; executing step L in a case that the value is a ninth preset value; and executing step M in a case that the value is a tenth preset value;

D. reading, by the smart card, a header component data of the APDU command from the communication buffer; processing, by the smart card, the unprocessed header component data when the size of the header component data read but unprocessed by the smart card matches the size of the data, which the smart card has read, in header component data; when the smart card does not read all data in header component, and there is no unread data in the communication buffer, returning to step B; amending, by the smart card, the first status flag to the second preset value when all the header component data are processed by the smart card, and determining whether there is unread data in the communication buffer, if yes, returning to step C; if no, returning to step B;

E. reading, by the smart card, a directory component data of the APDU command from the communication buffer; when the size of the directory component data read but unprocessed by the smart card matches size information comprised in the directory component data read by the smart card, processing, by the smart card, the unprocessed data; when the smart card does not read all data included in the directory component and there is no unread data in the communication buffer, returning to step B; amending, by the smart card, the first status flag to the third preset value when it has processed all data included in the directory component, and determining whether there is unread data in the communication buffer, if yes, returning to step C; if no, returning to step B;

F. reading, by the smart card, an applet component data of the APDU command from the communication buffer; processing, by the smart card, the unprocessed data when the size of the applet component data read but unprocessed by the smart card matches size information comprised in the applet component data read by the smart card; when the smart card does not read all applet component data included in the applet component, returning to step B; when the smart card has processed all applet component data included in the applet component, amending, by the smart card, the value of the first status flag to the fourth preset value, and determining whether there is unread data in the communication buffer, if yes, returning to step C; if no, returning to step B;

G. reading, by the smart card, an importing component data of the APDU command from the communication buffer; processing, by the smart card, the unprocessed data when the size of the importing component data read but unprocessed by the smart card matches size information comprised in the importing component data read by the smart card; when the smart card does not read all importing component data included in the importing component and there is no unread data in the communication buffer, it returning to step B; when the smart card has processed all importing component data included in the importing component, amending, by the smart card, the value of the first status flag to the fifth preset value, and determining whether there is unread data in the communication buffer, if yes, returning to step C, if no, returning to step B;

H. reading, by the smart card, a class component data of the APDU command from the communication buffer; when the smart card has read all class component data, and there is no unread data in the communication buffer, returning to step B; processing, by the smart card, the class component when all class component data included in the class component are read by the smart card, and amending the value of the first status flag to the sixth preset value, and determining whether there is unread data in the communication buffer, if yes, returning to step C; if no, returning to step B;

I. reading, by the smart card, a method component data of the APDU command from the communication buffer; when the smart card does not read all method component data included in the method component, and there is no unread data in the communication buffer, returning to step B; amending, by the smart card, the first status flag to the seventh preset value when the smart card has read all method component data included in the method component, and determining whether there is unread data in the communication buffer, if yes, returning to step C, if no, returning to step B;

J. reading, by the smart card, a static field component data of the APDU command from the communication buffer; processing, by the smart card, the unprocessed static field component data when the size of the static field data read but unprocessed by the smart card matches size information comprised in the static field component data read by the smart card; when the smart card does not read all static field component data included in the static field component, and there is no unread data in the communication buffer, returning to step B; when the smart card has processed all static field component data included in the static field component, amending, by the smart card, the value of the first status flag to the eighth preset value, and determining whether there is unread data in the communication buffer, if yes, returning to step C, if no, returning to step B;

K. reading, by the smart card, an export component data of the APDU command from the communication buffer; when the smart card does not read all export component data included in the export component, and there is no unread data in the communication buffer, returning to step B; when the smart card has read all export component data included in the export component, processing, by the smart card, the export component, and amending the value of the first status flag to the ninth preset value, and determining whether there is unread data in the communication buffer, if yes, returning to step C, if no, returning to step B;

L. reading, by the smart card, a constant pool component data of the APDU command from the communication buffer; when the smart card does not read all constant pool component data included in a constant pool component, and there is no unread data in the communication buffer, returning to step B; when the smart card has read all constant pool component data included in the constant pool component, processing, by the smart card, the constant pool component, and amending value of the first status flag to the tenth preset value, and determining whether there is unread data in the communication buffer, if yes, returning to step C, if no, returning to step B;

M. reading, by the smart card, a reference location component data of the APDU command from the communication buffer; processing, by the smart card, the unprocessed reference location component data when the size of the reference location component data read but unprocessed by the smart card matches size information comprised in the reference location component data read by the smart card; when the smart card does not read all reference location component data included in the reference location component, and there is no unread data in the communication buffer, returning to step B; when the smart card has processed all reference location component data included in the reference location component, the ending the method.

Preferably, before processing, by the smart card, the constant pool component, the method includes:

obtaining, by the smart card, the size information of the constant pool component from the directory component, and determining whether the size of the constant pool component is larger than the available memory space of a random access memory, if yes, allocating a space in a non-volatile memory for the constant pool component according to the size of constant pool component; if it is not larger than the available memory space, allocating a space in the random access memory for the constant pool component according to the size of constant pool component;

Processing, by the smart card, the constant pool component, includes:

storing, by the smart card, the constant pool component into the space which is allocated for the constant pool component;

updating, by the smart card, constant pool entry array elements in the constant pool component.

Preferably, before updating the constant pool component by the smart card, the method also includes:

obtaining, by the smart card, the number of elements of constant pool entry array from the constant pool component, and the count value of the first counter is set to the number of the elements of the constant pool entry array;

updating, by the smart card, the constant pool entry array elements in the constant pool component, including following steps:

step a, obtaining, by the smart card, an unparsed constant pool entry array element from the constant pool component, and determining a type of the current element according to the label of the current element, if the current element is a class reference, executing step b; if the element is an instance reference, executing step c; if the element is a super class reference, executing step d; if the element is a virtual method reference, executing step f; if the element is a static field reference, executing step j; if the element is a static reference, executing step k;

step b, determining, by the smart card, whether the most significant digit of the current element is 1, if the digit is 1, obtaining an importing package indicator in accordance with the current element, then obtaining an importing package serial number in accordance with the importing package indicator, and then obtaining an importing package class indicator according to the importing package serial number, then obtaining an importing package class virtual machine indicator according to the importing package class indicator, and then replacing the current element included in the constant pool entry array with the importing package class virtual machine indicator, and executing step m;

if the most significant digit is not 1, obtaining, by the smart card, an in-package class indicator according to the current element, and then obtaining an in-package class virtual machine indicator according to the in-package indicator, and then replacing the current element included in the constant pool entry array with the in-package class virtual machine indicator and executing step m;

step c, determining, by the smart card, whether the most significant digit of the current element is 1, if the digit is 1, obtaining, by the smart card, an importing package indicator according to the current element, then obtaining an importing package serial number according to the importing package indicator, and then obtaining an importing package class instance indicator according to the importing package serial number, and then obtaining an importing package class virtual machine indicator according to the importing package class instance indicator, and then obtaining a reference list index array element according to the importing package class virtual machine indicator, and then obtaining an importing package class reference indicator according to the reference list index array element, and then obtaining size information of the importing package class instance according to the importing package class reference indicator, and then replacing the current element in the constant pool list array with the size information of the importing package class instance and executing step m;

if the most significant digit is not 1, obtaining, by the smart card, an in-package class indicator according to the current element, and then obtaining an in-package class virtual machine indicator according to the in-package class indicator, and then obtaining a reference list index array element according to in-package class virtual machine indicator, and then obtaining an in-package class reference indicator according to the reference list index array element, and then obtaining size information of the in-package class instance according to the in-package class reference indicator, and then replacing the current element in the constant pool entry array with the size information of the in-package class instance, and executing step m;

if the most significant digit is not 1, obtaining, by the smart card, an in-package class instance indicator according to the current element, and then obtaining an in-package class instance virtual machine indicator according to the in-package class instance indicator, and then obtaining a reference list index array element according to the in-package class instance virtual machine indicator, and then obtaining an in-package class instance reference indicator according to the reference list index array element, and then obtaining size information of the in-package class instance according to the in-package class instance reference indicator, and then replacing the current element in the constant pool entry array with the size information of the in-package class instance, and executing step m;

step d, determining, by the smart card, whether the most significant digit of the current element is 1, if yes, then executing step e; if no, then executing step f;

step e, obtaining, by the smart card, an in-package super class indicator according to the current element, and then obtaining an in-package super class virtual machine indicator according to the in-package super class indicator, and then obtaining an in-package super class method indicator according to the in-package super class virtual machine indicator, and then obtaining an in-package super class method virtual machine indicator according to the in-package super class method indicator, and then replacing the current element in the constant pool entry array with the in-package super class method virtual machine indicator, and executing step m;

step f, obtaining, by the smart card, an importing package indicator and a method indicator according to the current element, and obtaining an importing package serial number according to the importing package indicator, and then obtaining a current importing package super class indicator according to the importing package serial number.

step g, obtaining, by the smart card, the importing package super class virtual machine indicator according to the current importing package super class indicator, and then obtaining a method table according to the importing package super class virtual machine indicator, and obtaining a method table cardinality according to the method table, and determining whether the method cardinality is not larger than the method indicator, if the cardinality is, executing step h; if the cardinality is larger than the method indicator, executing step i;

step h, obtaining, by the smart card, an importing package super class method virtual machine indicator from the method table, and replacing the current element in the constant pool entry array with the importing package super class method virtual machine indicator, and executing step m;

step i, obtaining, by the smart card, a corresponding importing package super class according to the current importing package super class indicator, and obtaining a super class indicator of the importing package super class from the importing package super class, and determining whether the super class indicator of the importing package super class is an illegal indicator, if yes, returning to step m; if no, replacing the current importing package super class indicator with the super class indicator of the importing package super class, and returning to step g;

step j, determining, by the smart card, whether the most significant digit of the current element is 1, if yes, obtaining, by the smart card, an importing package indicator according to the current element, and then obtaining an importing package serial number according to the importing package indicator, and then obtaining an importing package static field indicator according to the importing package serial number, and then obtaining an importing package static field virtual machine indicator according to the static field indicator of the importing package, and replacing the current element in the constant pool entry array with the static field virtual machine indicator of the importing package, and executing step m;

if the most significant digit is not 1, obtaining an in-package static field indicator according to the current element, and obtaining an in-package static field virtual machine indicator according to the in-package static field indicator, and then replacing the current element in the constant pool entry array with the in-package static field virtual machine indicator, and executing step m;

step k, determining, by the smart card, whether the most significant digit of the current element is 1, if yes, obtaining, by the smart card, an importing package indicator according to the current element, and obtaining an importing package serial number according to the importing package indicator, and then obtaining an importing package static method indicator according to the serial number of importing package, and obtaining an importing package static method virtual machine indicator according to the importing package static method indicator, and replacing the current element in the constant pool entry array with the importing package static method virtual machine indicator, and executing step m;

if the most significant digit is not 1, obtaining, by the smart card, an in-package static method indicator according to the current element, and then obtaining an in-package static method virtual machine indicator according to the in-package static method indicator, and then replacing the current element in the constant pool entry array with the in-package static method virtual machine indicator, and executing step m;

step m, incrementing, by the smart card, the count value of second counter by 1, determining, by the smart card, whether the count value of the first counter is zero, if yes, clearing all memory space in the constant poor component except the space occupied by the constant pool entry array; if no, returning to step a.

Preferably, processing, by the smart card, the reference location component data, includes:

obtaining, by the smart card, an offset address of the constant pool index in the method component according to the reference location component data;

obtaining, by the smart card, the constant pool index according to the offset address, and then obtaining contents of the corresponding constant pool entry array according to the constant pool index.

replacing, by the smart card the constant pool index stored in the address which is pointed at by the offset address with the contents of the constant pool entry array.

Preferably, the constant pool index includes the first constant pool index and the second constant pool index;

processing, by the smart card, the reference location component data, includes:

I. determining, by the smart card, the value of the second status flag, if the value is the eleventh preset value, executing step II; if the value is the twelfth preset value, executing step III; if the value is the thirteenth preset value, executing step IV; if the value is the fourteenth preset value, executing step V; if the value is the fifteenth preset value, executing step VI; if the value is the sixteenth preset value, executing step VII;

II. obtaining, by the smart card, the high byte of the number of elements of a single byte index array from the reference location component data, and setting a count value of the second counter according to the high byte, and amending the value of the second flag to the twelfth preset value, and returning to step I;

III. obtaining, by the smart card, the low byte of the number of elements of a single byte index array from the reference location component data, updating the count value of the second counter according to the low byte, and amending the value of the second flag to the thirteenth preset value, and returning to step I;

IV. obtaining, by the smart card, an unprocessed single byte index array element from the reference location component data, and obtaining an offset address of the first constant pool index in the method component, and obtaining contents of the corresponding constant pool entry array according to the first constant pool index stored in the address which is pointed at by the offset address, and replacing the first constant pool index stored in the address which is pointed at by the offset address with the contents of the constant pool entry array, making decrement to the count value of second counter by 1, determining, by the smart card, whether the count value of second counter is 0, if no, returning to step I; if yes, amending the value of second status flag to the fourteenth preset value, and returning to step I;

V. Obtaining, by the smart card, the high byte of the number of elements of a double-byte index array from the reference location component data, and setting a count value of the third counter in accordance with the high byte, and then amending the value of the second status flag to the fifth preset value, and returning to step I;

VI. Obtaining, by the smart card, the low byte of the number of elements of a double-byte index array from the reference location component data, updating the count value of the third counter, and amending the value of the second flag to the sixteenth preset value, and returning to step I;

VII. Obtaining, by the smart card, an unprocessed double-byte index array element from the reference location component data, and obtaining an offset address of the second constant pool index in the method component according to the double-byte index array element, and obtaining contents of the corresponding constant pool entry array in accordance with the second constant pool index stored in the address which is pointed at by the offset address, and replacing the second constant pool index stored in the address which is pointed at by the offset address with the contents of the constant pool entry array, and decrementing the count value of third counter by 1, determining, by the smart card, whether the count value of the third counter equals 0, if the value is not equal to 0, returning to step I; if the value equals 0, ending the process of processing the reference location component.

Preferably, obtaining, by the smart card, an unprocessed single-byte index array element from the reference location component data, includes:

obtaining, by the smart card, unprocessed current operational data in a single-byte index array from the reference location component data, and determining the current operational data in the single-byte index array is less than 255, if the data is not less than 255, updating the count value of the fourth counter to the sum of the current number of the fourth counter and 255, and returning to step I; if the data is less than 255, updating the count value of the fourth counter to the sum of the current number of the fourth counter and the current operational data in the single-byte index array, and taking the count value of the fourth counter as the unprocessed single-byte index array element;

obtaining, by the smart card, an unprocessed double-byte index array element from the reference location component data, including:

obtaining, by the smart card, unprocessed current operational data from the reference location component data, and determining the current operational data in the double-byte index array is less than 255, if the data is not less than 255, updating the count value of the fifth counter to the sum of the current number of the fifth counter and 255, and returning to step I; if the data is less than 255, updating the count value of the fifth counter to the sum of the current number of the fifth counter and the current operational data in the double-byte index array, and taking the count value of the fifth counter as the unprocessed double-byte index array element.

The present disclosure also provides a method for processing a CAP document by a smart card, including:

A. establishing a connection between the smart card and external terminal and initializing;

B. receiving, by the smart card, an APDU command corresponding to CAP documents, and storing the data comprised in the APDU command into a communication buffer;

C. determining, by the smart card, the state parameter in the APDU command, if the value of the state parameter is the first preset value, executing step D; if the value is the second preset value, executing step E; if the value is the third preset value, executing step F; if the value is the fourth preset value, executing step G; if the value is the fifth preset value, executing step H; if the value is the sixth preset value, executing step I; if the value is the seventh preset value, executing step J; if the value is the eighth preset value, executing step K; if the value is the ninth preset value, executing step L; if the value is the tenth preset value, executing step M;

D. reading, by the smart card, a header component data of the APDU command from the communication buffer; processing, by the smart card, the unprocessed header component data when the size of header component data read but unprocessed by the smart card matches the size of data included in header component data read by the smart card; if the smart card does not read all header component data included in the header component, and there is not unread data in the communication buffer, returning to step B; if the smart card has processed all header component data included in the header component, returning to step B;

E. reading, by the smart card, a directory component data of the APDU command from the communication buffer;

processing, by the smart card, the unprocessed directory component data when the size of directory component data read but unprocessed by the smart card matches the size of data included in directory component data read by the smart card; if the smart card does not read all directory component data included in the directory component, and there is no unread data in the communication buffer, returning to step B; if the smart card has processed all header component data included in the directory component, returning to step B;

F. reading, by the smart card, an applet component data of the APDU command from the communication buffer; processing, by the smart card, the unprocessed applet component when the size of applet component data read but unprocessed by the smart card matches the size of data, read by the smart card, included in applet component data; if the card does not read all applet component data included in the applet component, and there is not unread data in the communication buffer, returning to step B; if the smart card has processed all applet component data in the applet component, returning to step B;

G. reading, by the smart card, an importing component data of the APDU command from the communication buffer; processing, by the smart card, the unprocessed import component data when the size of the importing component data read but unprocessed by the smart card matches the size of the data in importing component data read by the smart card; if the smart card does not read all importing component data in the importing component, and there is no unread data in the communication buffer, returning to step B; if the smart card has processed all importing component data, returning to step B;

H. Reading, by the smart card, a class component data of the APDU command from the communication buffer; when the smart card does not read all class component data in the class component, and there is no unread data in the communication buffer, returning to step B; if the smart card has read all class component data in the class component, processing, by the smart card, the class component, and returning to step B;

I. Reading, by the smart card, a method component data of the APDU command from the communication buffer; if the smart card does not read all method component data in the method component, and there is not unread data in the communication buffer, returning to step B; when the smart card has read all method component data in the method component, processing, by the smart card, the method component, and returning to step B;

J. Reading, by the smart card, a static field component data of the APDU command from the communication buffer; processing, by the smart card, unprocessed static field component data when the size of the static field component data read but unprocessed by the smart card matches the size of the data in static field component read by the smart card; if the smart card does not read all static field component data in the static field component, and there is no unread data in the communication buffer, returning to step B; if the smart card has processed all static field component data in the static field component, returning to step B;

K. Reading, by the smart card, an export component data of the APDU command from the communication buffer; if the smart card does not read all export component data included in the export component, and there is no unread data in the communication buffer, returning to step B; if the smart card has read all export component data in the export component, processing the export component by the smart card, and returning to step B;

L. Reading, by the smart card, a constant pool component data of the APDU command from the communication buffer; if the smart card does not read all constant pool component data included in the constant pool component, and there is no unread data in the communication buffer, returning to step B; processing, by the smart card, the constant pool component, and returning to step B, when it has read all constant pool component in the constant pool component;

M. reading, by the smart card, a reference location component data of the APDU command from the communication buffer; processing, by the smart card, the unprocessed reference location component data when the size of the reference location component data read but unprocessed by the smart card matches the size of the reference location component data read by the smart card; if the smart card does not read all reference location component data in reference location component, and there is no unread data in communication buffer, returning to step B; when the smart card has processed all reference location component data included in the reference location component, ending the process.

Preferably, before processing, by the smart card, the constant pool component, the method also includes:

obtaining, by the smart card, the size information of the constant pool component from the directory component, and determining whether the size of the constant pool component is larger than the available memory space of a random access memory, if yes, allocating memory space for the constant pool component in a nonvolatile memory according to the size of the constant pool component; if the size is not larger than the available memory space, allocating memory space for the constant pool in the random access memory according to the size of the constant pool component;

processing, by the smart card, the constant pool component, including:

storing, by the smart card, the constant pool component into the memory space which is allocated for the constant pool component;

updating, by the smart card, the constant pool entry array elements in the constant pool component.

Preferably, before updating, by the smart card, the constant pool entry array elements in the constant pool component, the method also includes:

obtaining, by the smart card, the number of elements of the constant pool entry array from the constant pool component, and setting a count value of the first counter to the number of elements of the constant entry array;

updating, by the smart card, the constant pool entry array elements in the constant pool array, including:

step a, obtaining, by the smart card, an unparsed constant pool entry array element from the constant pool component, determining a type of the current element according to the current element label, if the element is a class reference, executing step b; if the element is an instance reference, executing step c, if the element is a super class method reference, executing step d; if the element is a virtual method reference, executing step f; if the element is a static field reference, executing step I; if the element is a static method reference, executing step k;

step b, determining, by the smart card, whether the most significant digit of the current element is 1, if yes, obtaining an importing package indicator in accordance with the current element, and obtaining an importing package serial number in accordance with the importing package indicator, and obtaining an importing package class indicator in accordance with the importing package serial number, and obtaining an importing package class virtual machine indicator in accordance with the importing package class indicator, and replacing the current element in the constant pool entry array with the importing package class virtual machine indicator, and executing step m;

if the digit is not 1, obtaining, by the smart card, an in-package class indicator in accordance with the current element, obtaining an in-package class virtual machine indicator in accordance with the in-package class indicator, and replacing the current element in the constant pool entry array with the in-package class virtual machine, and executing step m;

step c, determining, by the smart card, whether the most significant digit of the current element is 1, if yes, obtaining an importing package indicator in accordance with the current element, and obtaining an importing package serial number in accordance with the importing package indicator, and obtaining an importing package class indicator in accordance with the importing package serial number, and obtaining an importing package class virtual machine indicator in accordance with the importing package class indicator, and obtaining a reference list index array element in accordance with the importing package class virtual machine indicator, and obtaining an importing package class reference indicator in accordance with the reference list index array element, and obtaining a piece of size information of importing package class instance in accordance with the importing package class reference indicator, and replacing the current element in the constant pool entry array with the size information of the importing package instance, and executing step m;

if no, obtaining, by the smart card, an in-package class instance indicator in accordance with the current element, and obtaining an in-package class instance virtual machine indicator in accordance with the in-package class instance indicator, and obtaining a reference list index array element in accordance with the in-package instance virtual machine indicator, and obtaining an in-package class instance reference indicator in accordance with the reference list index array element, and obtaining a piece of size information of the in-package class instance reference in accordance with the in-package class instance reference indicator, and replacing the current element in the constant pool entry array with the size information of the in-package class instance reference, and executing step m;

step d, determining, by the smart card, whether the most significant digit of the current element is 1, if no, executing step e; if yes, then executing step f;

step e, obtaining, by the smart card, an in-package super class indicator in accordance with the current element, and obtaining an in-package super class virtual machine indicator in accordance with the in-package super class indicator, and obtaining an in-package super class method indicator in accordance with the in-package super class virtual machine indicator, and obtaining an in-package super class method virtual machine indicator in accordance with the in-package super class method indicator, and then replacing the current element in the constant pool entry array with the in-package super class method virtual machine indicator, and executing step m;

step f, obtaining, by the smart card, an importing package indicator and a method indicator in accordance with the current element, and obtaining an importing package serial number in accordance with the importing package indicator, and obtaining an importing package super class indicator in accordance with the importing package serial number;

step g, obtaining, by the smart card, the importing package super class virtual machine indicator in accordance with the current importing package super class indicator, and obtaining a method table in accordance with the importing package super class virtual machine indicator, and obtaining a method table cardinal number in accordance with the method table, and determining whether the method table cardinal number is not larger than the method indicator, if the cardinal number is less than the method indicator, executing step h; if the number is larger than the method indicator, executing step I;

step h, obtaining, by the smart card, an importing package super class method virtual machine indicator from the method table, and replacing the current element in the constant pool table with the importing package super class method virtual machine indicator, and executing step m;

step i, obtaining, by the smart card, a corresponding importing package super class in accordance with the current importing package super class indicator, and obtaining a super class indicator of the importing package super class from the importing package super class, and determining whether the super class indicator of the importing package super class is an illegal indicator, if yes, returning to step m; if no, replacing the current importing package super class indicator with the super class indicator of the importing package super class, and returning to step g;

step j, determining, by the smart card, the most significant digit of the current element is 1, if yes, obtaining an importing package indicator in accordance with the current element, and obtaining an importing package serial number in accordance with the importing package indicator, and obtaining an importing package static field indicator in accordance with the importing package serial number, and obtaining an importing package static field virtual machine indicator in accordance with the importing package static field indicator, and then replacing the current element in the constant pool entry array with the importing package static field virtual machine indicator, and executing step m;

if no, obtaining, by the smart card, an in-package static field indicator in accordance with the current element, and obtaining an in-package static field virtual machine indicator in accordance with the in-package static field indicator, and then replacing the current element in the constant pool entry array with the in-package static field virtual machine, and executing step m;

step k, determining, by the smart card, whether the most significant digit of the current element is 1, if yes, obtaining an importing package indicator in accordance with the current element, and obtaining an importing package serial number according to the importing package indicator, and obtaining an importing package static method indicator in accordance with the importing package serial number, and obtaining an importing package static field method virtual machine indicator in accordance with the importing package static method indicator, and replacing the current element in the constant pool entry array with the importing package static method virtual machine indicator, and executing step m;

if no, obtaining, by the smart card, an in-package static method indicator in accordance with the current element, and obtaining an in-package static method virtual machine indicator in accordance with the in-package static method indicator, and then replacing the current element in the constant pool entry array with the in-package static method virtual machine indicator, and executing step m;

step m, after the count value of the first counter minus 1, determining, by the smart card, whether the count value of the first counter is 0, if yes, clearing all memory space in the constant poor component except the space occupied by the constant pool entry array; if no, returning to step a.

Preferably, processing, by the smart card, the reference location component data, includes:

obtaining, by the smart card, an offset address of the constant pool index in the method component in accordance with the reference location component data;

obtaining, by the smart card, the constant pool index in accordance with the offset address, and obtaining contents of the corresponding the constant pool entry array in accordance with the constant pool index;

replacing, by the smart card, the constant pool index stored in the address which is pointed at by the offset address with the contents of the constant pool entry array.

Preferably, the constant pool index includes the first constant pool index and the second constant pool index;

processing, by the smart card, the reference location component data, includes:

I. determining, by the smart card, the value of the second status flag, if the value of the second status flag is the eleventh preset value, executing step II; if the value of the second status flag is the twelfth preset value, executing step III; if the value of the second status flag is the thirteenth preset value, executing step IV; if the value of the second status flag is the fourteenth preset value, executing step V; if the value of the second status flag is the fifteenth preset value, executing step VI; if the value of the second status flag is the sixteenth preset value, executing step VII;

II. obtaining, by the smart card, the high byte of the number of elements of a single byte index array from the reference location component data, and setting a count value of the second counter according to the high byte, and amending the value of the second flag to the twelfth preset value, and returning to step I;

III. obtaining, by the smart card, the low byte of the number of elements of a single byte index array from the reference location component data, updating the count value of the second counter according to the low byte, and amending the value of the second flag to the thirteenth preset value, and returning to step I;

IV. obtaining, by the smart card, an unprocessed single byte index array element from the reference location component data, and obtaining an offset address of the first constant pool index in the method component in accordance with the single byte index array element, and obtaining contents of corresponding constant pool entry array in accordance with the first constant pool index stored in the address which is pointed at by the offset address, after the count value of the second counter minus 1, determining whether the count value of the second counter equals 0, if no, returning to step I; if yes, amending the value of the second flag to the fourteenth preset value, and returning to step I;

V. obtaining, by the smart card, the high byte of the number of elements of a double byte index array from the reference location component data, and setting a count value of the third counter according to the high byte, and amending the value of the second flag to the fifteenth preset value, and returning to step I;

VI. obtaining, by the smart card, the low byte of the number of elements of a double byte index array from the reference location component data, updating the count value of the third counter according to the low byte, and then amending the value of the second flag to the sixteenth preset value, and returning to step I;

VII. Obtaining, by the smart card, an unprocessed double byte index array element from the reference location component data, and then obtaining an offset address of the second constant pool index in the method component in accordance with the double byte index array element, and obtaining contents of the corresponding constant pool entry array in accordance with the second constant pool index stored in the address which is pointed at by the offset address, and then replacing the second constant pool index stored in the address which is pointed at by the offset address with the contents of the constant pool entry array, decrementing the count value of third counter by 1, it determining whether the count value of the third counter equals 0, if no, returning to step I; if yes, ending the procedure of processing the reference location component.

Preferably, obtaining, by the smart card, an unprocessed single byte index array element from the reference location component data, includes:

obtaining, by the smart card, unprocessed current operational data in the single byte index array from the reference location component data, and then determining whether the current operational data in the single byte index array is less than 255, if the data is not less than 255, updating the count value of the fourth counter to the sum of the current count value of the fourth counter and 255, and returning to step I; if the data is less than 255, then updating the count value of the fourth counter to the sum of the current count value of the fourth counter and the current operational data in the single byte index array, and taking the count value of the fourth counter as the unprocessed single byte index array element;

obtaining, by the smart card, an unprocessed double byte index array element from the reference location component data, including:

obtaining, by the smart card, unprocessed current data in the double byte index array from the reference location component data, determining whether the current operational data in the double byte index array is less than 255, if the data is not less than 255, then updating the count value of the fifth counter to the sum of the current count value of the fifth counter and 255, and returning to step I; if the data is less than 255, updating the count value of the fifth counter to the sum of the current count value of the fifth counter and the current operational data in the double byte index array, and taking the count value of the fifth counter as the unprocessed double byte index array element.

Advantages of the present disclosure are as follow: the present disclosure provides a method for processing a CAP document by a smart card, which can use the storage space of a smart card more effectively, enhance the speed of CAP documents downloading, and ensure integrity of CAP documents and contents in the smart card during downloading.

DETAILED DESCRIPTION

The present disclosure is further described with the embodiments and the drawings below to make the objective, technical solution and advantages more clearly. Nevertheless, the following embodiments are just a few of embodiments of the disclosure. Any other embodiments made by those skilled in the art on the basis of embodiments of the disclosure without creative work fall in the protective scope of the disclosure.

The disclosure provides a method for using the smart card to process CAP documents in order to use storage space in the smart card system effectively and to enhance speed of CAP documents downloading. CAP documents includes 12 components, namely, a header component, the directory component, the applet component, the importing component, the class component, the method component, the static field component, the export component, the constant pool component, the reference location component, the descriptor component, the debugging component.

Embodiment 1

Figure 1:
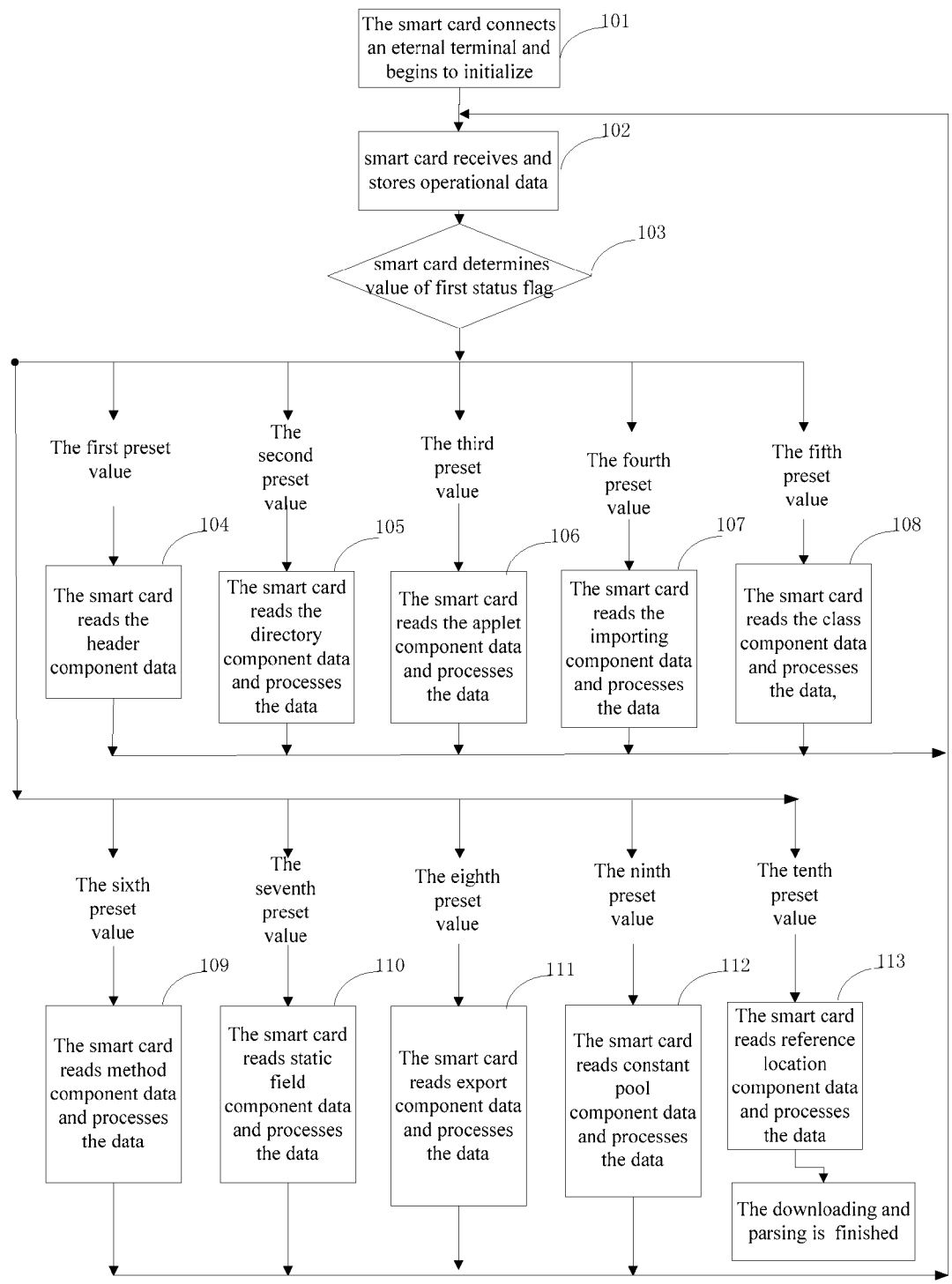
FIG. 1 is a flowchart of a method for processing CAP documents by a smart card according to embodiment 1 of the disclosure.
Figure 2:
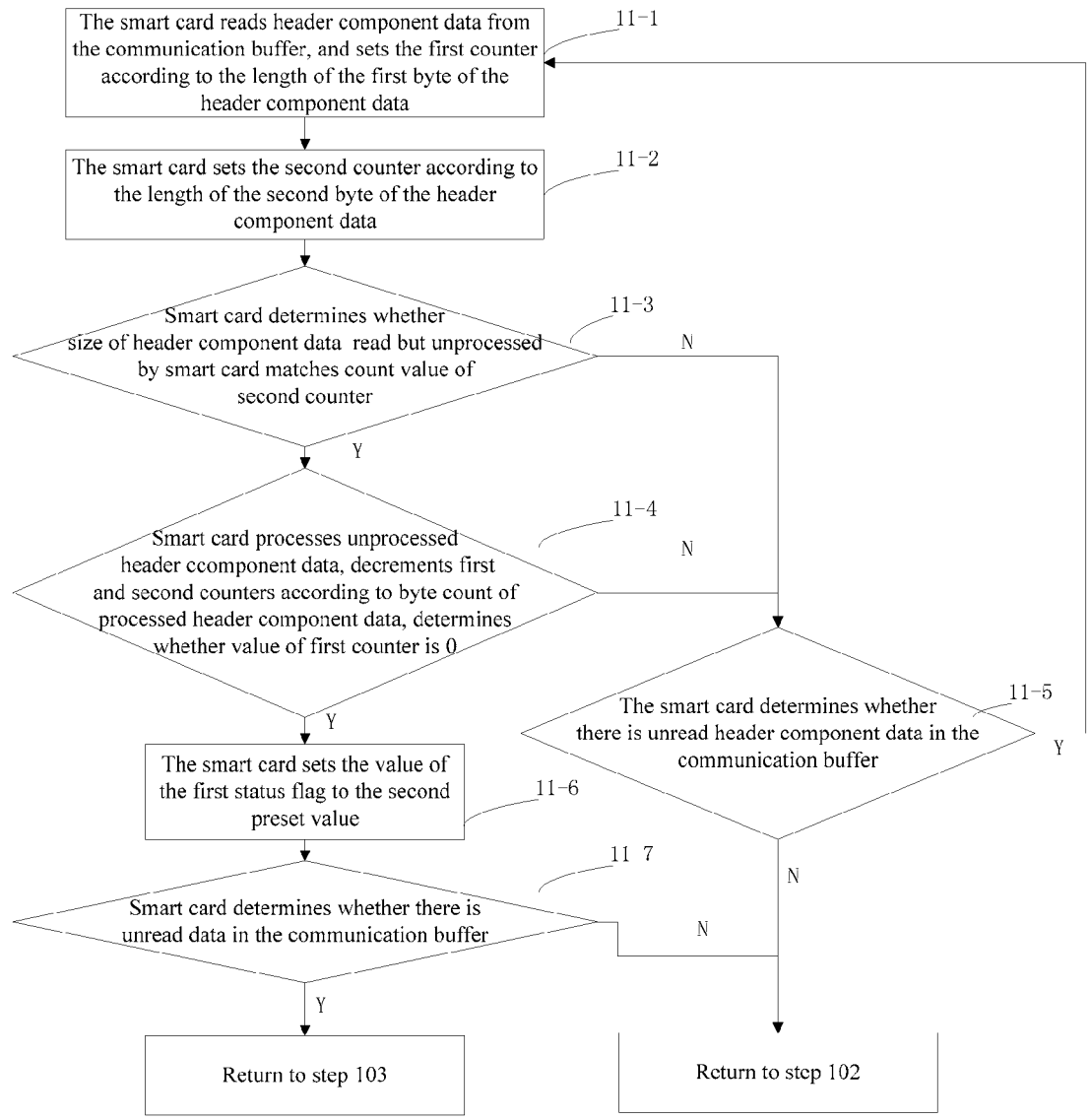
FIG. 2 is a flowchart of a method for processing the header component data according to embodiment 1 of the disclosure.

Embodiment 1 of the disclosure provides a method for using a smart card to process CAP documents; the method is further described with FIG. 1, including:

step 101, the smart card connects to an external terminal and performs initialization;

preferably, in the embodiment, after initialization, the first status flag of the smart card is 0;

step 102, the smart card receives corresponding APDU (Application Protocol Data Unit) commands of CAP documents, and stores the data included in APDU command into the communication buffer;

step 103, the smart card determines the value of the first status flag, if the value of the first status flag is the first preset value, executing step 104; if the value of the first status flag is the second preset value, executing step 105; if the value of the first status flag is the third preset value, executing step 106; if the value of the first status flag is the fourth preset value, executing step 107; if the value of the first status flag is the fifth preset value, executing step 108; if the value of the first status flag is the sixth preset value, executing step 109; if the value of the first status flag is the seventh preset value, executing step 110; if the value of the first status flag is the eighth preset value, executing step 111; if the value of the first status flag is the ninth preset value, executing step 112; if the value of the first status flag is the tenth preset value, executing step 113;

preferably, in the embodiment, the first preset value of the first status flag is 0; the second preset value of the first status flag is 1; the third preset value of the first status flag is 2; the fourth preset value of the first status flag is 3; the fifth preset value of the first status flag is 4; the sixth preset value of the first status flag is 5; the seventh preset value of the first status flag is 6; the eighth preset value of the first status flag is 7; the ninth preset value of the first status flag is 8; the tenth preset value of the first status flag is 9;

step 104, the smart card reads and processes the header component data, the method for processing the header component data is further described in FIG. 2 as following steps:

step 11-1, the smart card reads the header component data from the communication buffer and sets the first counter in accordance with the length of the first byte of the header component data;

in the embodiment, in CAP documents, the component data adopts a TLV format which is a format of variable length, the TLV format of the component data is shown as table 1:

TABLE 1

| T | $L_1$ | $L_2$ | V | ... | $L_2$ | V | $L_2$ | V |
|---|---|---|---|---|---|---|---|---| the component data with TLV format includes: the tag which is remarked by T, the length which is remarked by L, and the value which is remarked by V; the tag means the type of the current component data, the byte counts is constant; the length means the length of value, which includes the length of the first byte and the length of the second byte; as showing in table 1, the length of the first byte L1 means the size information of the data included in entire component data, the length of the second byte L2 means the size information of the data included in the component data read currently, the byte counts of the byte length is constant as well; the value determines the byte counts in accordance with the value of the byte length; the first counter is used for calculating the size of the data included in entire header component;

step 11-2, the smart card sets the second counter in accordance with the length of the second byte of the header component data read currently;

in the embodiment, the second counter is used for calculating the size of the data included in the header component data read currently;

step 11-3, the smart card determines whether the size of the unprocessed header component data read by the smart card matches the count value of the second counter; if yes, executing step 11-4; if no, executing step 11-5;

step 11-4, the smart card processes contents of the unprocessed header component data, and makes corresponding subtract operation to the first counter and the second counter according to the byte counts of the processed header component data, and then determines whether the value of the first counter is 0, if yes, executing step 11-6; if no, executing step 11-5;

in the embodiment, if the count value of the second counter is 0, the procedure of processing the header component data read currently is finished; if the count value of the first counter is 0, the procedure of processing the header component is finished;

specifically, the header component data includes: the package app identifier, the package version number, and may further include the package name; the smart card processes contents of the header component data, including:

A-1, the smart card gets the package app identifier from the header component and creates the object for the package app identifier;

A-2, the smart card determines whether there is a package name in the header component, if yes, executing step A-3; if no, executing step A-4;

A-3, the smart card creates an object for the package name in accordance with the package name, and then generates the package name object reference; the smart card creates the package information class and writes the package app identifier object, the package version number, and package name object reference into the package information class;

in the embodiment, the smart card generates the package name object reference when creating the package name object;

A-4, the smart card creates the package information class and writes the package app identifier object and the package version number into the package information class;

step 11-5, the smart card determines whether there is unread header component data in the communication buffer; if yes, returning to step 11-1; if no, returning to step 102;

step 11-6, the smart card amends the value of the first status flag to the second preset value;

step 11-7, the smart card determines whether there is unread data in the communication buffer, if yes, executing step 103; if no, executing step 102;

step 105, the smart card reads the directory component data from the communication buffer, and then processes the data, the procedure of processing is similar to the procedure showed in FIG. 2, but the processing contents of the component data is different, including:

step 12-1, the smart card reads the directory component data from the communication buffer and sets the first counter in accordance with the length of the first byte of the directory component data;

in the embodiment, the first counter is used for calculating the size information of all data included in the directory component;

step 12-2, the smart card sets the second counter in accordance with the length of the second byte read currently in the directory component data;

in the embodiment, the second counter is used for calculating the size information of the data read currently in the directory component data;

step 12-3, the smart card determines whether the size of the directory component data read but unprocessed by the smart card matches the count value of the second counter; if yes, executing step 12-4; if no, executing step 12-5;

step 12-4, the smart card processes unprocessed contents of the directory component data, and makes corresponding subtract operation to the first counter and the second counter in accordance with the byte counts of processed directory component data, and determines whether the count value of the first counter is 0, if yes, executing step 12-6; if no, executing step 12-5;

in the embodiment, if the count value of the second counter is 0, the procedure of processing the read directory component data is finished; if the count value is 0, the procedure of processing the directory component data is finished.

Figure 3:
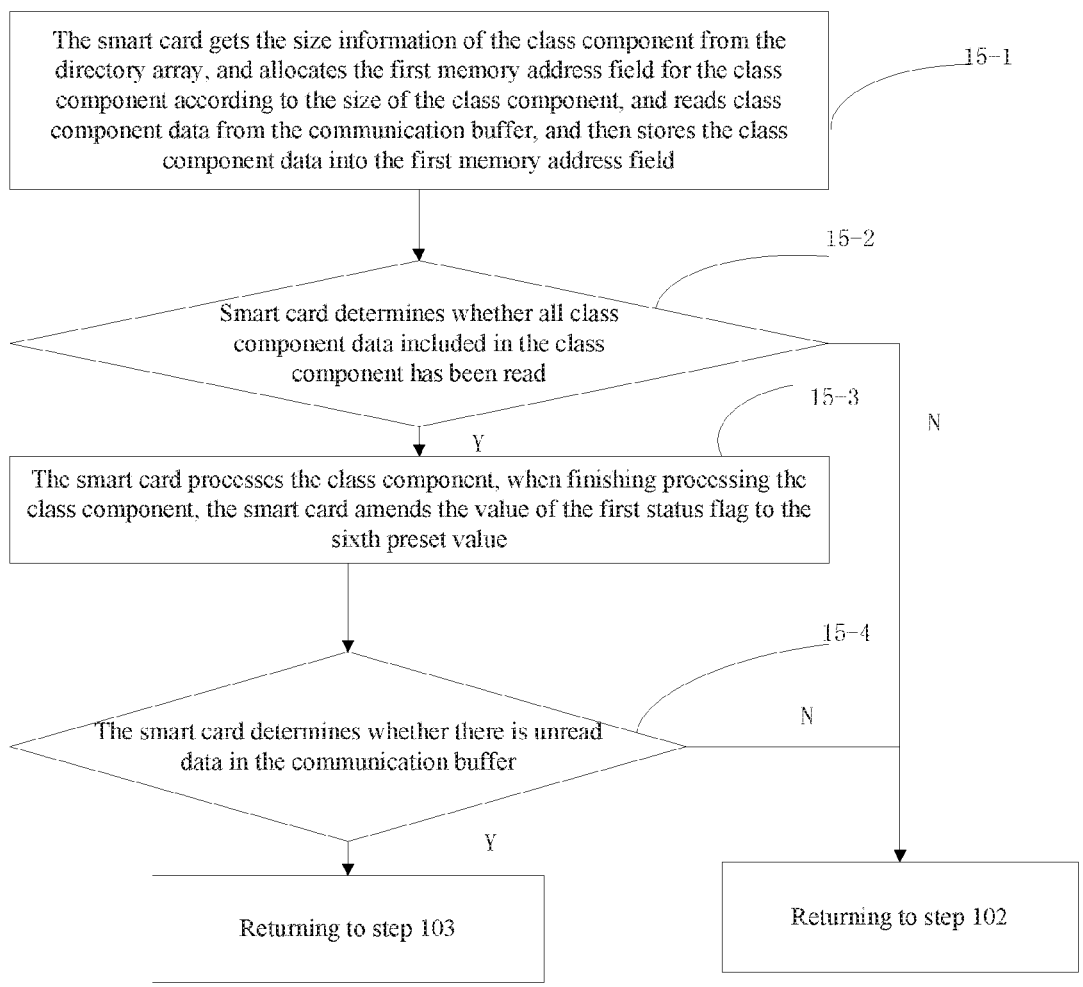
FIG. 3 is a flowchart of a method for processing the class component data according to embodiment 1 of the disclosure.

Specifically, processing the directory component data includes following steps:

step B-1, the smart card creates a directory array in accordance with the size information of 12 components in the directory component;

step B-2, the smart card stores the size information of at least 10 components into the directory array;

in the embodiment, the smart card stores the size information of the header component, the directory component, the app component, the importing component, the class component, the method component, the static field component, the export component, the constant pool component, and the reference location component into the directory array, and may further stores the descriptor component and the debug component;

step 12-5, the smart card determines whether there is unread directory component data in the communication buffer; if yes, continuing to read the directory component data from the communication buffer, and returning to step 12-2; if no, executing step 102;

step 12-6, the smart card amends the value of the first status flag to the third preset value;

step 12-7, the smart card determines whether there is unread data in the communication buffer, if yes, executing step 103; if no, executing step 102;

step 106, the smart card reads the applet component data from the communication buffer, and then processes the data, that is similar to process showed in FIG. 2 but the processing of the contents is different, steps are showed as follow:

step 13-1, the smart card reads the applet component data from the communication buffer, and sets the first counter in accordance with the length of the first byte in the applet component data;

in the embodiment, the first counter is used for calculating the size of all data included in the applet component;

step 13-2, the smart card sets the second counter in accordance with the length of the second byte read in the applet component data;

in the embodiment, the second counter is used for calculating the size of data read in the applet component data;

step 13-3, the smart card determines whether the size of the directory component data read but unprocessed matches the count value of the second counter; if yes, executing step 13-4; if no, executing step 13-5;

step 13-4, the smart card processes unprocessed contents of the applet component data, and makes corresponding subtract operations to the first counter and the second counter in accordance with the byte counts of the applet component data which has been processed, and determines whether the count value of the first counter is 0, if yes, executing step 13-6; if no, executing step 13-5;

in the embodiment, if the count value of the second counter is 0, the procedure of processing the read applet component data is finished; if the count value of the first counter is 0, the procedure of processing the applet component data is finished.

specifically, in the embodiment, the applet component includes the number of the app class and the app identifier of the applet component, and processing the applet component includes following steps:

C-1, the smart card gets the number of the applet class and the app identifier of the applet component from the applet component, and creates an object for the app identifier of the applet component in accordance with the app identifier of the applet component, and generates an app identifier object reference;

C-2, the smart card writes the app identifier object reference into the package information class;

step 13-5, the smart card determines whether unread applet component data is in the communication buffer; if yes, continuing to read applet component data from the communication buffer, and returning to step 13-2; if no, executes step 102;

step 13-6, the smart card amends the value of the first status flag to the fourth preset value;

step 13-7, the smart card determines whether there is unread data in the communication buffer; if yes, executing step 103; if no, executing step 102;

step 107, the smart card reads the importing component data from the communication buffer, and then processes the data, the procedure of processing is similar to the one showed in FIG. 2, but the processing of the contents of the component data is different, steps are showed as follow:

step 14-1, the smart card reads importing component data from the communication buffer, and sets the first counter in accordance with the length of the first byte in the importing component data;

in the embodiment, the first counter is used for calculating the size of all data included in the importing component;

step 14-2, the smart card sets the second counter in accordance with the length of the second byte of the importing component data read currently;

in the embodiment, the second counter is used for calculating the size of the data included in the importing component data read currently;

step 14-3, the smart card determines whether the size of the importing component data read but unprocessed by the smart card matches the count value of the second counter; if yes, executing step 14-4; if no, executing step 14-5;

step 14-4, the smart card processes unprocessed importing component data, and makes corresponding subtract operations to the first counter and the second counter in accordance with the byte counts of processed importing component data, and then determines whether the count value of the first counter is 0, if yes, executing step 14-6; if no, executing step 14-5;

in the embodiment, the count value of the second counter is 0, the procedure of processing the importing component data read currently is finished; if the count value of the first counter is 0, the procedure of processing the importing component data is finished.

specifically, processing the importing component data includes following steps:

D-1, the smart card gets the related information of the importing package from the importing component;

in the embodiment, the importing component includes the related information of many importing packages, the related information may include: the importing package applet identifier, the importing package serial number, may further include the importing package name; each importing package identifier corresponds to an importing package serial number, each importing package serial number corresponds to an importing package;

D-2, the smart card creates an importing array;

D-3, the smart card gets an importing package serial number from the related information of unparsed importing package and stores them into the importing array;

D-4, the smart card determines whether there is related information of unparsed importing package, if yes, returning to step D-3; if no, the procedure of processing the import component is finished;

step 14-5, the smart card determines whether unread importing component data is in the communication buffer; if yes, continuing to read the importing component data from the communication buffer, and returning to step 14-2; if no, executes step 102;

step 14-6, the smart card amends the value of the first status flag to the fourth preset value;

step 14-7, the smart card determines whether there is unread data in the communication buffer, if yes, executing step 103; if no, executing step 102;

step 108, the smart card reads the class component data from the communication buffer and processes the data as the method showed in FIG. 3 which includes following steps:

step 15-1, the smart card gets the size information of the class component from the directory array, and allocates the first memory address field for the class component according to the size of the class component, and reads the class component data from the communication buffer, and then stores class component data into the first memory address field;

step 15-2, the smart card determines whether all class component data included in the class component are read by the smart card, if yes, executing step 15-3; if no, returning to step 102;

in the embodiment, that the first memory address field is full means the class component data included in the class component has been read; the class component, which is the core of the program execution, includes all interface information and class information of CAP documents, which are both named as class component unit information;

step 15-3, the smart card processes the class component, if the smart card has finished processing the class component, the card amends the value of the first status flag to the sixth preset value;

specifically, the smart card processes the class component as following steps:

E-1: the smart card determines whether the class component unit information is the interface information according to the class component unit information flag, if yes, executing step E-2; if no, executing step E-3;

preferably, in the embodiment, that the class component unit information flag is 1 means the class component unit information is the interface information; that the class component unit information flag is 0 means the class component unit information is the class information;

E-2: the smart card processes the interface information;

E-3: the smart card processes the class information;

step 15-4: the smart card determines whether there is unread data in the communication buffer, if yes, executing step 103; if no, executing step 102;

step 109: the smart card reads the method component data from the communication buffer and processes the data, the procedure of processing the method component is similar to the procedure of processing the class component, but the processing the contents of the component data is different, including:

step 16-1: the smart card gets the size information of the method component from the directory array, and allocates the second memory address field for the method component in accordance with the size of the method component, and reads the method component data from the communication buffer, and stores the method component data into the second memory address field;

step 16-2: the smart card determines whether the card has read all method component data included in the method component, if yes, clearing exception messages in the method component, and executing step 16-3; if no, returning to step 102;

in the embodiment, that the first memory address field is full means all method component data included in the method component has been read;

step 16-3: the smart card amends the value of the first status flag to the seventh preset value;

step 16-4: the smart card determines whether there is unread data in the communication buffer, if yes, executing step 103; if no, executing step 102;

step 110: the smart card reads the static field component data from communication buffer and processes them, the procedure of processing the static field component data is similar to the procedure of processing the header component data, but the processing the contents of the component data is different, including: step 17-1: the smart card reads the static field component data from the communication buffer, and sets the first counter in accordance with the length of the first byte in the static field component data;

in the embodiment, the first counter is used for calculating the size of all data included in the static field component;

step 17-2: the smart card sets the second counter in accordance with the length of the second byte in the static field component data read currently;

in the embodiment, the second counter is used for calculating the size information of data included in the static field component data which has been read currently;

step 17-3: the smart card determines whether the size of the static field component data read but unprocessed by the smart card matches the count value of the second counter; if yes, executing step 17-4; if no, executing step 17-5;

step 17-4: the smart card processes the unprocessed static field component data, and uses corresponding subtract operation on the first counter and the second counter in accordance with the byte counts of the processed static field component data, and determines whether the count value of the first counter is 0, if yes, executing step 17-6; if no, executing step 17-5;

in the embodiment, all static field component data read currently has been processed when the count value of the second counter is 0; all static field component data has been processed when the count value of the first counter is 0.

Specifically, processing the data of the static field component includes following steps:

G-1: the smart card gets the size information of the static field component from the directory component, and allocates the third memory address field for the static field component in accordance with the size of the static field component;

G-2: the smart card stores the static field component into the third memory address field;

G-3: the smart card creates a static array and initializes the static array;

preferably, in the embodiment, the smart card uses a default value (0) to initialize the static array;

G-4: the smart card clears the uninitialized static array;

step 17-5: the smart card determines whether unread static field component data is in the communication buffer; if yes, continuing to read the static field component data, and returning to step 13-2; if no, executing step 102;

step 17-6: the smart card amends the value of the first status flag to the eighth preset value;

step 17-7: the smart card determines whether there is unread data in the communication buffer, if yes, executing step 103; if no, executing step 102;

step 111: the smart card reads the export component data and processes them, the procedure of processing the export component is similar to the procedure of processing the class component, but the processing of the contents of the component data is different, including:

step 18-1: the smart card gets the size information of the export component from the directory component, and allocates the fourth memory address field for the export component in accordance with the size, and reads the export component data from the communication buffer, and stores the export component data into the fourth memory address field;

step 18-2: the smart card determines whether all export component data included in the export component has been read, if yes, processing the export component, and executing step 18-3; if no, returning to step 102;

specifically, processes the export component, containing:

the export component includes: the class offset address, the static field offset array, the static method offset array;

H-1: the Java allocates the virtual machine identifier for the class offset address;

H-2: the smart card gets an offset address of the static field from the static field offset array, and gets a static field reference in accordance with the static field offset address, and allocates the virtual machine identifier for the static field reference;

H-3: the smart card gets the offset address of the static constant pool index from the static method offset array, and gets the static method reference in accordance with the offset address, and allocates the virtual machine identifier for the static method reference;

step 18-3: the smart card amends the value of the first status flag to the ninth preset value;

step 18-4: the smart card determines whether there is unread data in the communication buffer, if yes, executing step 103; if no, executing step 102;

step 112: the smart card reads the constant pool component data from the communication buffer and processes the data, including:

step 19-1: the smart card gets the size information of the constant pool component from the directory array, and determines whether the size is less than the memory space of the first memory, if yes, reading the constant pool component data from the communication buffer and storing them into the first memory; if no, reading the constant pool component data from the communication buffer and storing them into the second memory;

in the embodiment, the first memory is a random access memory, while the second memory is a nonvolatile memory;

step 19-2: the smart card determines whether all constant pool component data included in the constant component has been read, if yes, processing the export component, and executing step 19-3; if no, returning to step 102;

specifically, processing the constant pool component includes:

I-1: after the smart card gets the number of elements of the constant pool entry array from the constant pool component, the count value of the third counter is set to the number of elements;

in the embodiment, the third counter is used for counting the number of elements of the constant pool entry array;

I-2: the smart card gets the constant pool entry array element from the constant pool component, and determines which type the current element of the constant pool entry array is in accordance with the label of the current element of the constant pool entry array;

in the embodiment, types of the constant pool entry array elements includes: the class reference, the instance reference, the super method reference, the static field reference, and the static method reference;

preferably, in the embodiment, the first byte of the current element of the constant pool entry array means a label of the current element of the constant pool entry array;

I-3: the smart card operates in accordance with the type of the constant pool entry array, for details see the method for parsing the constant pool component in embodiment 3, there is no need to give unnecessary details herein;

I-4: the smart card makes decrement to the count value of the third counter;

in the embodiment, after the smart card makes decrement to the count value of the third counter, the count value means the number of unparsed elements in the constant pool entry array;

I-5: the smart card determines whether the count value of the third counter equals 0, if yes, the parsing of the constant pool component is finished; if no, returning to step I-2;

step 19-3: the smart card amends the value of the first status flag to the tenth preset value;

step 19-4: the smart card determines whether there is unread data in the communication buffer, if yes, executing step 103; if no, executing step 102;

step 113: the smart card reads the reference location component data from the communication buffer and processes them, including:

step 110-1: the smart card reads the current operational data of the reference location component from the communication buffer;

in the embodiment, the operational data includes: the high byte of the number of elements of the single byte index array, the low byte of the number of elements of the single byte index array, the single byte index array elements, the high byte of the number of elements of the double byte index array, the low byte of the number of elements of the double byte index array, the double byte index array elements;

step 110-2: the smart card processes the current operational data of the reference location array;

specifically, the previous operation is that determining the value of the second status flag and operating according to the value;

in the embodiment, the value of the second status flag include: the eleventh preset value, the twelfth preset value, the thirteen preset value, the fourteenth preset value, the fifteenth preset value and the sixteenth preset value;

preferably, in the embodiment, the eleventh preset value of the second status flag is 0; the twelfth preset value of the second status flag is 1; the thirteenth preset value of the second status flag is 2; the fourteenth preset value of the second status flag is 3; the fifteenth preset value of the second status flag is 4; the sixteenth preset value of the second status flag is 5;

the smart card gets the high byte of the number of elements of the single byte index array in accordance with the reference location component and processes them correspondingly when the value of the second status flag is the eleventh preset value;

specifically, the smart card sets the third counter and clears the current operational data of the reference location component; the smart card sets the second card mode to the second mode and returns to step 110-1;

preferably, in the embodiment, the smart card sets the third counter in accordance with the high byte of the number of elements of the single byte index array;

when the value of the second status flag is the twelfth preset value, the smart card gets the low byte of the number of elements of the single byte index array according to the current operational data and processes correspondingly;

specifically, the smart card resets the third counter and clears the current operational data of the reference location component; the smart card sets the second card mode to the third mode and returns to step 110-1;

preferably, in the embodiment, the process of the smart card resetting the third counter includes: the smart card adds the value, which gets through shifting left the count value of the third counter by eight-bit by the smart card, and the value of the low byte of the number of elements of the single byte index array together;

the smart card gets a single byte index array element in accordance with the reference location component and processes the element correspondingly when the value of the second status flag is the thirteenth preset value;

the smart card processes the single byte index array element, including:

00-1: the smart card determines whether the value of the current operational data of the reference location component equals 255, if yes, executing step 00-2; if no, executing step 00-3;

in the embodiment, the value of the operational data ranges from 0 to 255; the smart card reads a single byte index array element, which is the offset address of the constant pool index in the method component, from the reference location component when the card is in the third mode;

00-2: the smart card resets the fourth counter and returns to step 110-1;

in the embodiment, the fourth counter is used for metering the offset address of the first constant pool index in the method component, and the initial count value of the fourth counter is 0; the smart card resets the fourth counter, including that the smart card adds the current count value of the fourth counter and 255 together;

00-3: the smart card sets the count value of the fourth counter to the sum of the current count value of the fourth counter and the current operational data;

00-4: the smart card gets contents of the first constant pool entry array in accordance with the offset address of the first constant pool index in the method component;

in the embodiment, the first constant pool index is stored in the address which is pointed at by the offset address of the first constant pool index in the method component, and contents of the first constant pool entry array are stored in the address of the first constant pool index;

00-5: the smart card replaces the contents, that is the address of the first constant pool index, stored in the address which is pointed at by the offset address of the first constant pool index in the method component with the contents of the first constant pool table;

00-6: the smart card makes decrement to the count value of the third counter;

in the embodiment, after the smart card makes decrement to the count value of the third counter, the count value means the number of unparsed elements in the single byte index array;

00-7: the smart card determines whether the count value of the third counter equals 0, if yes, executing step 00-8; if no, returning to step 110-1;

00-8: the smart card sets the second card mode to the fourth mode, and returns step 110-1;

the smart card gets the high byte of the number of elements of the double byte index array in accordance with the current operational data in the reference location component and processes them correspondingly when the second card mode is the fourth mode;

specifically, the smart card resets the third counter and clears the current operational data of the reference location component; and the smart card sets the second card mode to the fifth mode and returns to step 110-1;

preferably, the smart card resets the third counter in accordance with the high byte of the length of the single byte index array;

the smart card gets the low byte of the number of elements of the double byte index array in accordance with the current operational data and process the byte correspondingly when the second card mode is the fifth mode;

specifically, the smart card resets the third counter and clears the current operational data of the reference location component; and the smart card sets the second card mode to the sixth mode and returns to step 110-1;

the smart card gets an double byte index array element in accordance with the current operational data and processes it correspondingly when the second card mode is the sixth mode;

corresponding operations by the smart card is characterized in that:

01-1: the smart card determines whether the value of the current operational data of the reference location component equals 255, if yes, executing step 01-2; if no, executing step 01-3;

in the embodiment, the value of the operational data ranges from 0 to 255; the smart card reads the double byte index array element, which is an offset address of the second constant pool index in the method component, from the reference location component when the card is in sixth mode;

01-2: the smart card resets the fourth counter and returns to step 110-1;

in the embodiment, the fourth counter is used for metering the offset address of the second constant pool index in the method component, and the smart card resets the fourth counter, including: the smart card adds the current count value of the fourth counter and 255 together;

01-3: the smart card sets the count value of the fourth counter to the sum of the current count value of the fourth counter and the current operational data of the reference location component,

01-4: the smart card gets contents of the second constant pool index in accordance with the offset address of the second constant pool index in the method component;

in the embodiment, the second constant pool index address is stored in the address which is pointed at by the offset address of the second constant pool index in the method component, and contents of the second constant pool table are stored in the address of the second constant pool index;

01-5: the smart card replaces the contents stored in the address which is pointed at by the offset address of the second constant pool index in component with the contents of the second constant pool table;

01-6: the smart card makes decrement to the count value of the third counter;

in the embodiment, after the smart card makes decrement to the count value of the third counter, the count value means the number of unparsed elements in the double byte index array;

01-7: the smart card determines whether the count value of the third counter equals 0, if yes, the process of downloading and parsing the reference location component is finished; if no, returning to step 110-1;

preferably, in the embodiment, clearing the current component data after processing the component data.

Embodiment 2

Figure 4:
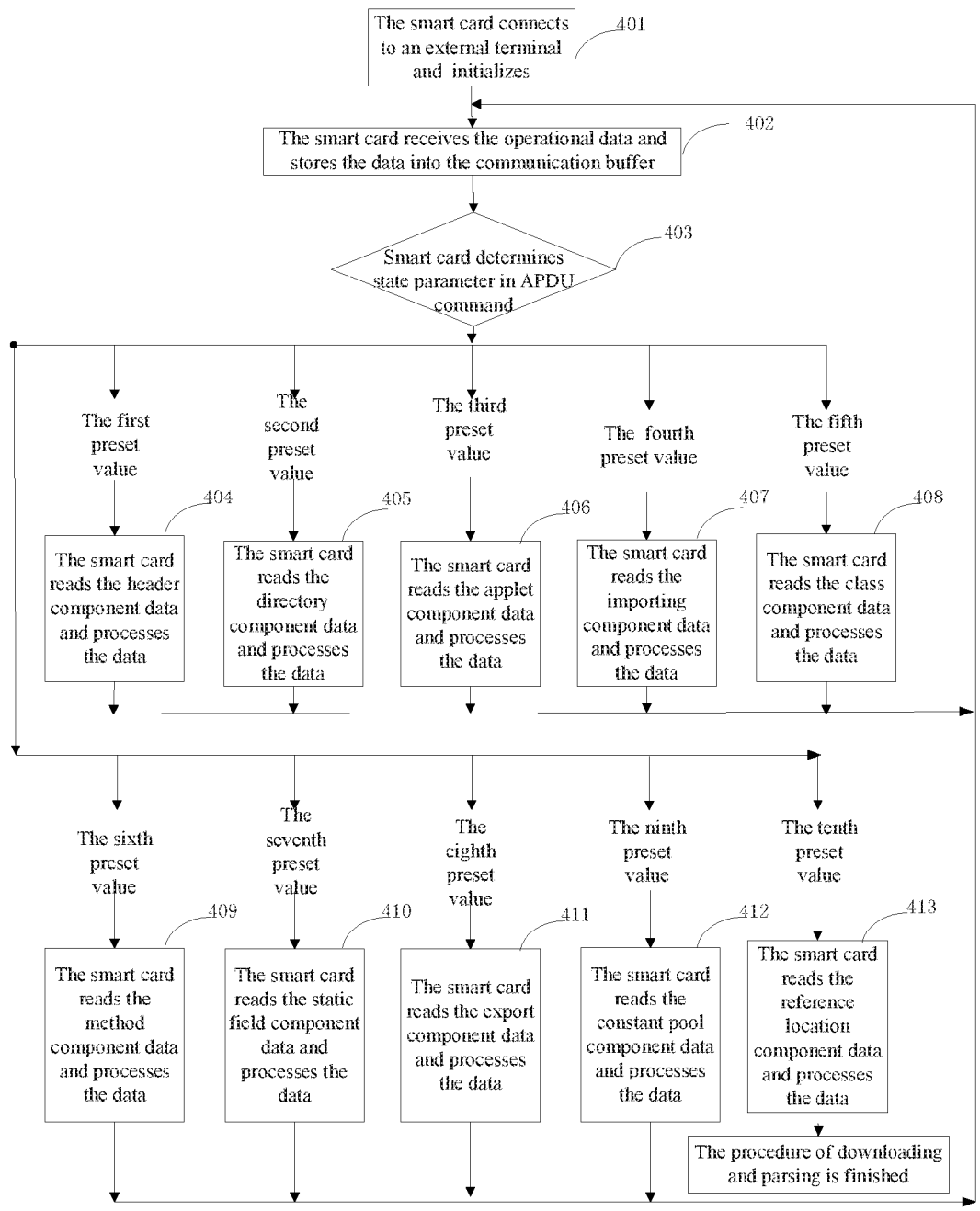
FIG. 4 is a flowchart of a method for processing CAP documents by the smart card in another way according to embodiment 2 of the disclosure.
Figure 5:
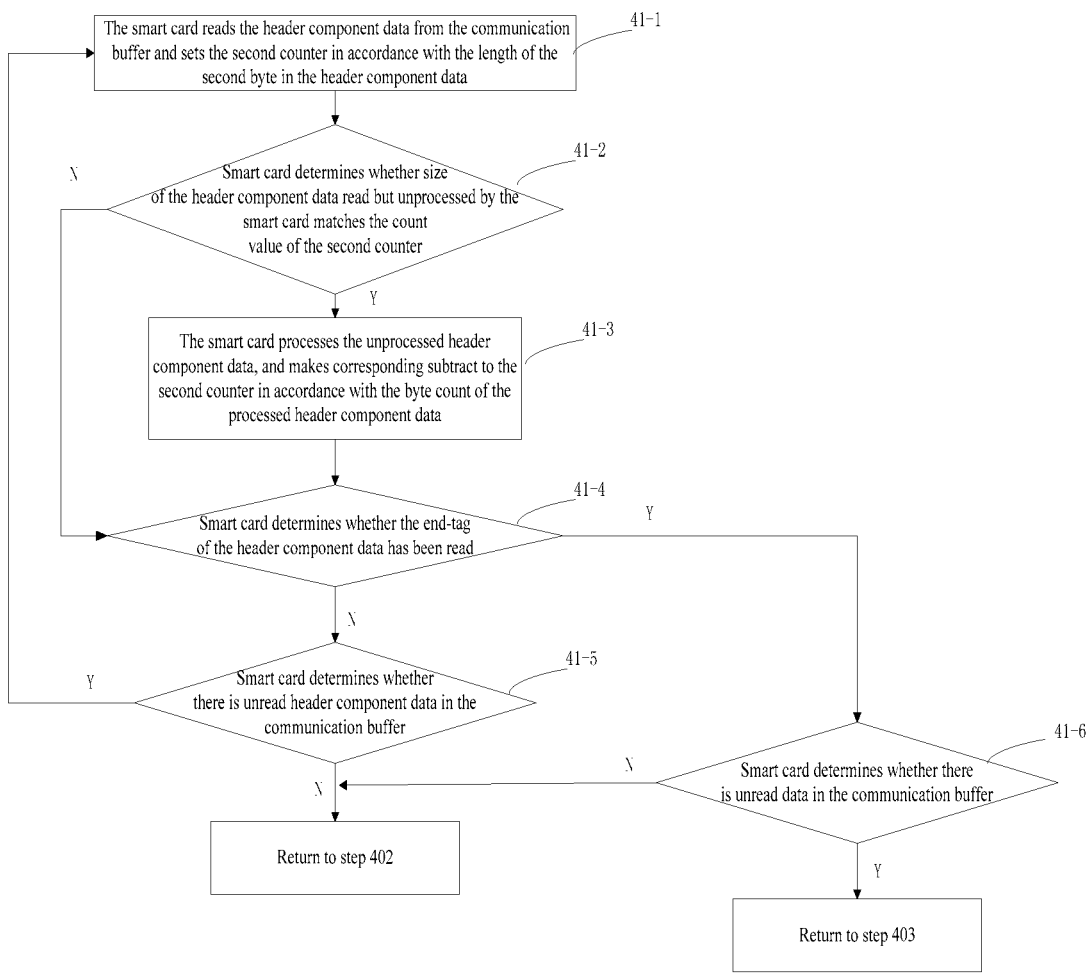
FIG. 5 is a flowchart of a method for processing the header component data in another way according to embodiment 2 of the disclosure.

Embodiment 2 of the present disclosure provides another way to process CAP documents by the smart card, which is further described with FIG. 4, including:

step 401: the smart card connects to an external terminal and performs initialization;

step 402: the smart card receives the APDU command corresponding to the CAP documents, and stores the data included in APDU command into a communication buffer;

step 403: the smart card determines the state parameter in the APDU command, if the state parameter is a first preset value, executing step 404; if the state parameter is a second preset value, executing step 405; if the state parameter is a third preset value, executing step 406; if the state parameter is a fourth preset value, executing step 407; if the state parameter is a fifth preset value, executing step 408; if the state parameter is a sixth preset value, executing step 409; if the state parameter is a seventh preset value, executing step 410; if the state parameter is an eighth preset value, executing step 411; if the state parameter is a ninth preset value, executing step 412; if the state parameter is a tenth preset value, executing step 413;

preferably, in the embodiment, the first preset value of the state parameter is 0; the second preset value of the state parameter is 1; the third preset value of the state parameter is 2; the fourth preset value of the state parameter is 3; the fifth preset value of the state parameter is 4; the sixth preset value of the state parameter is 5; the seventh preset value of the state parameter is 6; the eighth preset value of the state parameter is 7; the ninth preset value of the state parameter is 8; the tenth preset value of the state parameter is 9;

step 404: the smart card reads the header component data from the communication buffer and processes them, which is further described in FIG. 5, including:

step 41-1: the smart card reads the header component data from the communication buffer and sets the second counter in accordance with the length of the second byte in the header component data;

in the embodiment, the component data, which adopts another TLV format, in CAP documents is converted to an APDU command which meets ISO7816-3, another TLV format of ADPU commands shows as table 2:

TABLE 2

Figure 6:
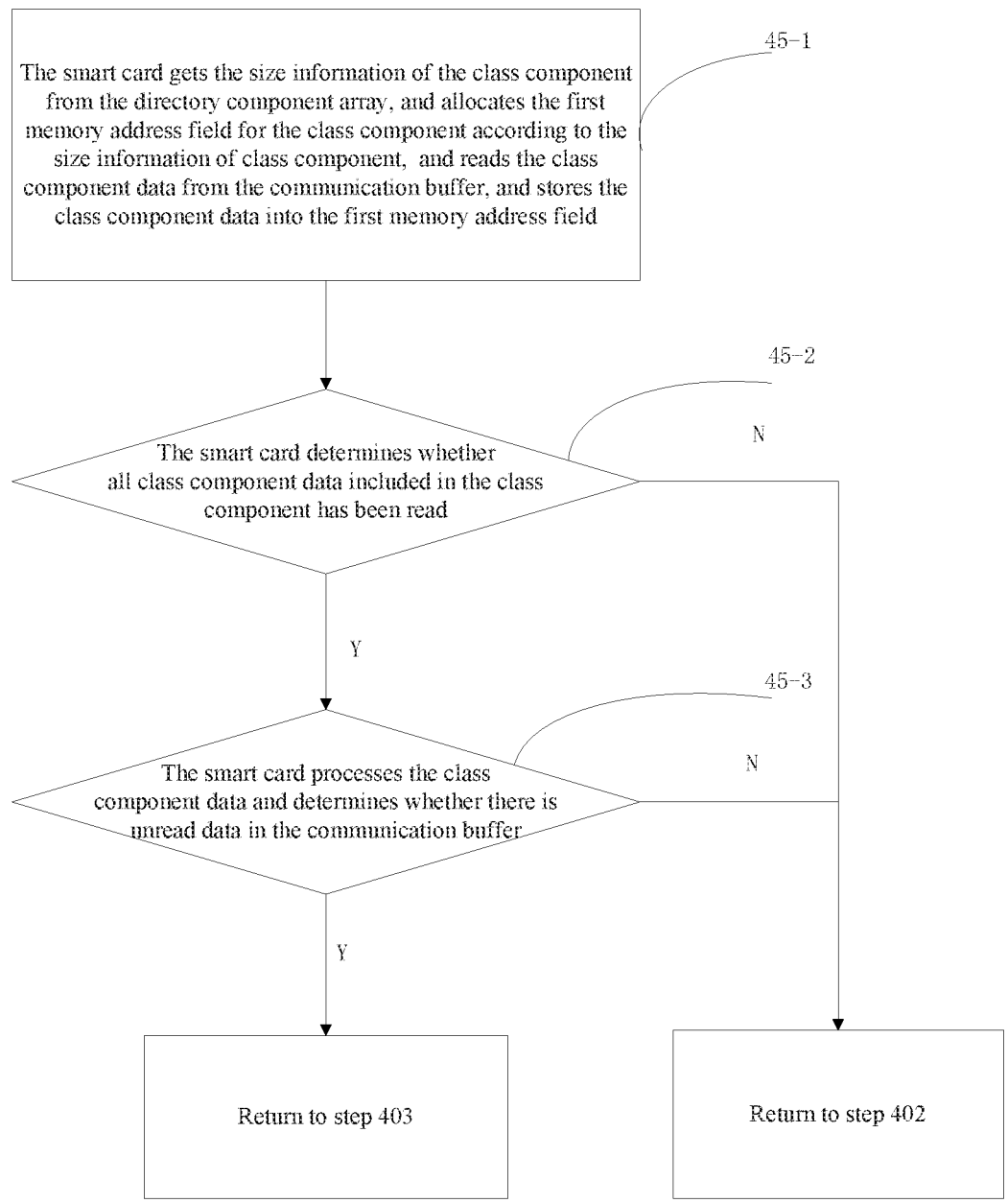
FIG. 6 is a flowchart of a method for processing the class component data in another way according to embodiment 2 of the disclosure.

| $T_1$ | L | V | ... | L | V | $T_2$ | including: tag 1, the length, the value, tag 2; tag 1 means the type of the current component data which is determined by the value of parameter P1, and the byte counts is constant; the length, whose byte length is constant, means the size of the data included in component data read currently; the byte counts of the value is changeable; tag 2 means that data transmission of the component data of current type is finished; the header component data contains: the package app identifier, the package version number, may further contains the package name; the second counter is used for metering the size of the data included in the header component data read currently; the second counter is used for calculating the size of the data included in the header component data read currently;

step 41-2: the smart card determines whether the size of the header component data read but unprocessed by the smart card matches the count value of the second counter; if yes, executing step 41-3, if no, executing step 41-4;

step 41-3: the smart card processes unprocessed header component data, and makes corresponding subtract to the second counter in accordance with the byte counts of processed header component data;

in the embodiment, when the count value of the second counter is 0, all header component data read currently, has been processed;

specifically, processing the header component data include following steps:

A-1: the smart card gets a package app identifier from the header component and creates an object for it;

A-2: the smart card determines whether there is a package name in the header component, if yes, executing step A-3; if no, executing step A-4;

A-3: the smart card creates the package name object, and generates the package name object reference; the smart card creates the package information class and writes the package app identifier object, the package version number, the package name object reference into the package information class;

in the embodiment, the smart card generates the package name object reference when creating the package name object;

A-4: the smart card creates the package information class and writes the package app identifier object, the package version number into the package information class;

step 41-4: the smart card determines whether the end-tag of the header component data has been read, if yes, executing step 41-6; if no, executing step 41-5;

step 41-5: the smart card determines whether unread header component data is in the communication buffer; if yes, returning to step 41-1; if no, executing step 402;

step 41-6: the smart card determines whether there is unread data in the communication buffer; if yes, executing step 403; if no, executing step 402;

step 405: the smart card reads the directory component data from the communication buffer and processes them, the procedure of processing is similar to step 404, but the processing of contents of the component data is different, the processing contains following steps:

step 42-1: the smart card reads the directory component data from the communication buffer, and sets the second counter in accordance with the length of the second byte in the directory component data read currently;

in the embodiment, the second counter is used for metering the size of the data included in the directory component data read currently;

step 42-2: the smart card determines whether the size of the data read but unprocessed by the smart card matches the count value of the second counter; if yes, executing step 42-3; if no, executing step 42-4;

step 42-3: the smart card processes unprocessed directory component data, and executes corresponding subtract operation to the second counter in accordance with the byte counts of the directory component data which has been processed;

in the embodiment, when the count value of second counter is 0, all read directory component data has been processed;

specifically, processing the directory component data includes:

step B-1: the smart card creates the directory array in accordance with the size of 12 components in the directory component;

step B-2: the smart card stores the size information of at least 10 components into the directory array;

in the embodiment, the smart card stores the size information of the header component, the directory component, the app component, the importing component, the class component, the method component, the static field component, the export component, the constant pool component, and the reference location component into the directory array, and may further stores the size information of the descriptor component and the debugging component;

step 42-4: the smart card determines whether the end-tag of the directory component data has been read, if yes, executing step 42-6; if no, executing step 42-5;

step 42-5: the smart card determines whether there is unread directory component data in the communication buffer; if yes, continuing reading the header component data, and returning to step 42-2; if no, executing step 402;

step 42-6: the smart card determines whether there is unread data in the communication buffer, if yes, executing step 403; if no, executing step 402;

step 406: the smart card reads the applet component data from the communication buffer and processes them, the procedure of processing is similar to step 404, but the processing of contents of the component data is different, the processing contains following steps:

step 43-1: the smart card reads the applet component data from the communication buffer, and sets the second counter in accordance with the length of the second byte in the applet component data read currently;

in the embodiment, the second counter is used for metering the size of data included in the applet component data read currently;

step 43-2: the smart card determines whether the size of the data read but unprocessed by the smart card matches the count value of the second counter; if yes, executing step 43-3; if no, executing step 43-4;

step 43-3: the smart card processes unprocessed applet component data, and executes corresponding subtract operation to second counter in accordance with the byte counts of the applet component data which has been processed;

in the embodiment, all read applet component data has been processed when the count value of the second counter is 0;

specifically, in the embodiment, the applet component contains the number of the applet class and the applet identifier of the applet component, processing the contents of the applet component data includes following steps:

C-1: the smart card gets the number of the applet class and the applet identifier of applet component, and creates the applet identifier object of the applet component according to the applet identifier, and generates the applet identifier object reference;

C-2: the smart card writes the applet identifier object reference into the package information class;

step 43-4: the smart card determines whether the end-tag of the applet component data has been read, if yes, executing step 43-6; if no, executing step 43-5;

step 43-5: the smart card determines whether there is unread applet component data in the communication buffer; if yes, continuing reading the applet component data, and returning to step 43-2; if no, executing step 402;

step 43-6: the smart card determines whether there is unread data in the communication buffer, if yes, executing step 403; if no, executing step 402;

step 407: the smart card reads the importing component data from the communication buffer and processes them, the procedure of processing importing component is similar to step 404, but the processing of contents of the component data is different, the processing contains following steps:

step 44-1: the smart card reads the importing component data from the communication buffer, and sets the second counter in accordance with the length of the second byte in the importing component data read currently;

in the embodiment, the second counter is used for metering the size of the data included in the importing component data read currently;

step 44-2: the smart card determines whether the size of the importing component data read but unprocessed by the smart card matches the count value of the second counter; if yes, executing step 44-3; if no, executing step 44-4;

step 44-3: the smart card processes unprocessed importing component data, and makes corresponding subtract operation to the second counter in accordance with the byte counts of processed importing component data;

in the embodiment, all read importing component data has been processed when the count value of the second counter is 0;

specifically, processing the importing component data includes:

D-1: the smart card gets related information of the importing package from the importing component;

in the embodiment, the importing component includes related information of several importing packages, which may include: the importing package applet identifier, the importing package serial number, and may further include the importing package name; each importing package identifier corresponds to a importing package serial number, each importing package serial number corresponds to a importing package;

D-2: the smart card creates the importing array;

D-3: the smart card gets the importing package serial number from related information of unparsed importing package and stores them into the importing array;

D-4: the smart card determines whether there is related information of unparsed importing package, if yes, returning to step D-3; if no, the procedure of processing the importing package is finished;

step 44-4: the smart card determines whether the end-tag of the importing component data has been read, if yes, executing step 44-6; if no, executing step 44-5;

step 44-5: the smart card determines whether there is unread importing component data in the communication buffer; if yes, continuing reading the importing component data from the communication buffer, and returning to step 44-2; if no, executing step 402;

step 44-6: the smart card determines whether there is unread data in the communication buffer, if yes, executing step 403; if no, executing step 402;

step 408: the smart card reads the class component data from the communication buffer and processes them, the procedure of processing the class component is further described with FIG. 6, including following steps:

step 45-1: the smart card allocates the first memory address field for the class component according to the size of the class component which gets from the directory array, and reads the class component data from the communication buffer, and stores the data into the first memory address field;

step 45-2: the smart card determines whether all class component data included in the class component has been read, if yes, executing step 45-3; if no, returning to step 402;

step 45-3: the smart card processes the class component data and determines whether there is unread data in the communication buffer, if yes, executing step 403; if no, executing step 402;

in the embodiment, that the first memory address field is full means the class component data included in the class component has been finished reading which also can be determined by whether the end-tag included in the class component data has been read; the class component which contains all interface information and class information of CAP documents is the core of the program execution, all interface information and class information are called class component unit information;

specifically, processing class component includes following steps:

E-1: the smart card determines whether the class component unit information is the interface information through the class component unit information identifier, if yes, executing step E-2; if no, executing step E-3;

preferably, in the embodiment, the class component unit information is the interface information when the class component unit information identifier is 1; the class component unit information is the class information when the class component unit information identifier is 0;

E-2: the smart card processes the interface information;

E-3: the smart card processes the class information;

step 409: the smart card reads the method component data from the communication buffer and processes them, the procedure of processing is similar to step 408, but the processing the contents of the component data is different, the processing contains following steps:

step 46-1: the smart card allocates the second memory address field for the method component according to the size of the method component which gets form the directory array, and reads the method component data from the communication buffer, and stores the method component data into the second memory address field;

step 46-2: the smart card determines whether the method component data included in the method component has been finished reading, if yes, clearing the abnormal information in the method component data, and executing step 46-3; if no, returning to step 402;

in the embodiment, that the first memory address field is full means all method component data included in the method component has been read, which also can be determined by whether the end-tag in the method component data has been read;

step 46-3: the smart card determines whether there is unread data in the communication buffer, if yes, executing step 403; if no, executing step 402;

step 410: the smart card reads the static field component data from the communication buffer and processes them, the procedure of processing is similar to step 404, but the processing the contents of the component data is different, the processing contains following steps: step 47-1: the smart card reads the static field component data from the communication buffer, and sets the second counter in accordance with the length of the second byte in the static component data read currently;

in the embodiment, the second counter is used for metering the size of the data included in static field component data read currently;

step 47-2: the smart card determines whether the size of the static field component data read but unprocessed by the smart card matches the count value of the second counter; if yes, executing step 47-3; if no, executing step 47-4;

step 47-3: the smart card processes unprocessed static field component data, makes corresponding subtract operation to the second counter according to the byte counts of processed static component data;

in the embodiment, all read static field component data has been processed when the count value of the second counter is 0;

specifically, the procedure of processing the static field component data includes following steps:

G-1: the smart card allocates the third memory address field for the static field component in accordance with the size of the static field component which gets from the directory component;

G-2: the smart card stores the static field component into the third memory address field;

G-3: the smart card creates the static array and initializes the static array;

preferably, in the embodiment, the smart card uses the default value (0) to initialize the static array;

G-4: the smart card clears uninitialized static array;

step 47-4: the smart card determines whether the end-tag of the static field component data has been read, if yes, executing step 47-6; if no, executing step 47-5;

step 47-5: the smart card determines whether there is unread static field component data in the communication buffer; if yes, continuing reading the static field component data from the communication buffer, and returning to step 47-2; if no, executing step 402;

step 47-6: the smart card determines whether there is unread data in the communication buffer, if yes, executing step 403; if no, executing step 402;

step 411: the smart card reads the export component data from the communication buffer and processes them, the procedure of processing is similar to step 408, but the processing of the contents of the component data is different, including:

step 48-1: the smart card allocates fourth memory address field for the export component in accordance with size of method component which gets from the directory array, and reads export component data from the communication buffer, and stores them into the fourth memory address field;

step 48-2: the smart card determines whether all export component data included in the export component has been read, if yes, processing the export component, and executing step 48-3; if no, returning to step 402;

specifically, processing the export component includes following steps:

the export component contains: the class offset address, the static field offset array, the static method offset array;

H-1: the Java allocates the virtual machine identifier for the class offset address;

H-2: the smart card gets the static field offset address from the static field offset array, gets the static field reference in accordance with the static field offset address, and allocates the virtual machine identifier for the static field reference;

H-3: the smart card gets the offset address of the static constant pool index from the static method offset array, and gets the static method reference in accordance with the offset address of the static constant pool index, and allocates the virtual machine identifier for the static method reference;

step 48-3: the smart card determines whether there is unread data in the communication buffer, if yes, executing step 403; if no, executing step 402;

step 412: the smart card reads the constant pool component from communication buffer and processes the component, including:

step 49-1: the smart card gets the size of the constant pool component from the directory array and determines whether the size is less than the memory space of the first memory, if yes, reading the constant pool component data from the communication buffer and storing them into the first memory; if no, reading the constant pool component data from the communication buffer and storing them into the second memory;

in the embodiment, the first memory is the random access memory in the smart card, while the second memory is the non-volatile memory in the smart card;

step 49-2: the smart card determines whether all export component data has been read, if yes, processing the export component, and executing step 49-3; if no, returning to step 402;

specifically, processing the constant pool component includes following steps:

I-1: the smart card sets the count value of the third counter to the number of elements of the constant pool component which gets from the constant pool component;

in the embodiment, the third counter is used for metering the number of elements of the constant pool entry array;

I-2: the smart card gets the constant pool entry array element from the constant pool component, and determines which type the current element of the constant pool entry array is according to the tag of the constant pool entry array current element;

in the embodiment, types of the constant pool entry array element include: the class reference, the instance reference, the super class method reference, the static field reference, the static method reference;

preferably, in the embodiment, the first byte of the constant pool entry array current element means the tag of the current element of the constant pool entry array;

I-3: the smart card operates correspondingly according to the type of the constant pool entry array element, for more details see method for parsing constant pool component in embodiment 4, there is no need to give unnecessary details herein;

I-4: the smart card makes decrement to the count value of the third counter;

in the embodiment, after the smart card makes decrement to the count value of the third counter, the count value of the third counter means the number of unparsed elements in the constant pool entry array;

I-5: the smart card determines whether the count value of the third counter equals 0, if yes, the procedure of parsing the constant pool component is finished; if no, returning to step I-2;

step 49-3: the smart card determines whether there is unread data in the communication buffer, if yes, executing step 403; if no, executing step 402;

step 413: the smart card reads the reference location component data from the communication buffer and processes the data, which is same to step 113 in embodiment 1, there is no need to give unnecessary details herein.

Embodiment 3

Figure 7:
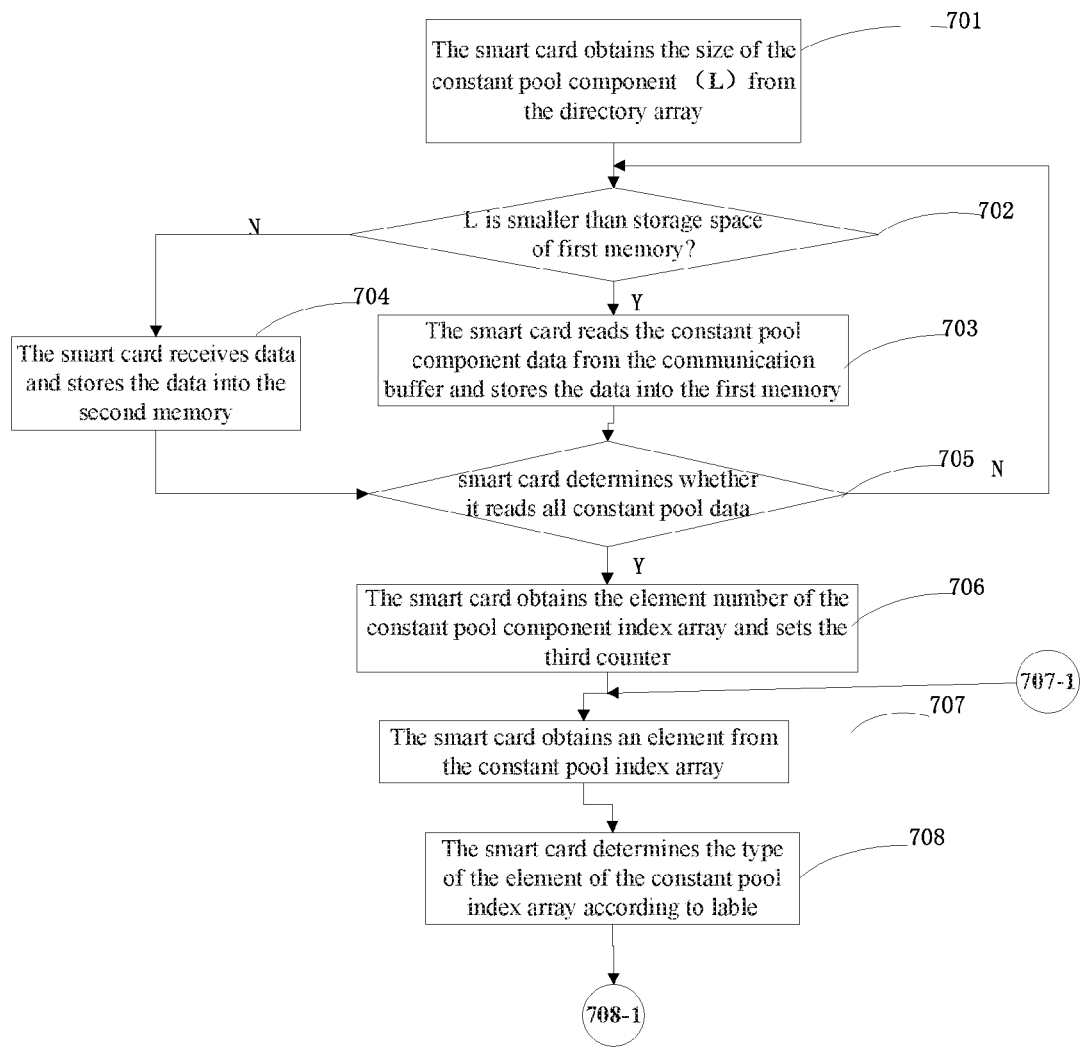
FIG. 7 is a flowchart of a method for downloading and parsing the constant pool component by the smart card according to embodiment 3 of the disclosure.

Embodiment 3 of the present disclosure provides a method for downloading and parsing the constant pool component by the smart card, which is further described with FIG. 7, including:

step 701: the smart card gets the size information of the constant pool component from the directory array;

in the embodiment, the smart card gets the size information of 12 components from the directory component and stores the components into the directory array when the card downloads and parses the directory component;

step 702: the smart card determines whether the size of the constant pool component is less than the memory space of the first memory, if yes, executing step 703; if no, executing 704;

in the embodiment, the first memory is a random access memory;

step 703: the smart card reads the constant pool component data from the communication buffer and stores them into the first memory, and executes step 705;

step 704: the smart card reads the constant pool component data from the communication buffer and stores them into the second memory, and executes step 705;

in the embodiment, the second memory is a non-volatile memory;

step 705: the smart card determines whether the constant pool component data included in the constant pool component has been finished reading, if yes, executing 706, if no, returning to step 702;

step 706: the smart card sets the count value of the third counter to the number of elements of the constant pool entry array which gets from the constant pool component;

in the embodiment, the third counter is used for metering the number of elements of the constant pool entry array;

step 707: the smart card gets a constant pool entry array element from the constant pool component;

in the embodiment, types of the constant pool entry array element include: the class reference, the instance reference, the super class method reference, the static field reference, the static method reference;

step 708: the smart card determines which type the current element of the constant pool entry array is according to the tag of the current element; the smart card operates correspondingly according to each type, and parses the current element to get contents of the constant pool table;

in the embodiment, the first byte of the constant pool entry array current element means the tag of the current element; specifically, contents of the parsed constant pool entry array include: the importing package class virtual machine identifier, the in-package class virtual machine identifier, the size of an importing package class instance reference, the size of an in-package class instance reference, the importing package super class method virtual machine identifier, the in-package super class method virtual machine identifier, the importing package static field virtual machine identifier, the in-package static held virtual machine identifier, the importing static method virtual machine identifier, the in-package static method virtual machine identifier;

when the type of the current element of the constant pool entry array is a class reference, procedure includes:

step 72-1: the smart card determines whether the most significant digit of the current element of the constant pool entry array is 1, if yes, executing step 72-2; if no, executing step 72-8;

in the embodiment, when the type of the current element of the constant pool entry array is an instance reference, that the most significant digit is 1 means the class is defined in the importing package, and the current element of the constant pool entry array contains an importing package identifier; that the most significant digit is 0 means the class is defined the in-package, and the current element of the constant pool entry array contains an in-package class identifier;

step 72-2: the smart card gets an importing package identifier and an importing package serial number through the current element of the constant pool entry array;

step 72-3: the smart card gets an importing package class identifier according to the importing package serial number;

in the embodiment, contents in the address at which is pointed by the importing package serial number is an importing package class identifier when the type of the current element of the constant pool entry array is an instance reference;

step 72-4: the smart card gets an importing package class virtual machine identifier according to the importing package class identifier;

in the embodiment, contents in the address which is pointed at by the importing package class identifier is the importing package class virtual machine identifier;

step 72-5: the smart card gets a reference table index array element according to the importing package class virtual machine identifier;

in the embodiment, the importing package class virtual machine identifier points to the address of the reference table index array element, contents stored in the address are reference table index array elements;

step 72-6: the smart card gets an importing package class reference identifier according to the reference table index array element;

in the embodiment, the reference table index array element is an offset address of the importing package class reference identifier in the class component, which stores the importing package class reference;

step 72-7: the smart card gets the size of the importing package class instance according to the importing package class reference identifier and writes the size into the constant pool entry array to replace the current element, and executes step 709;

in the embodiment, the third byte of the offset address which is pointed at by the importing package class reference identifier is the size of the importing package class instance;

step 72-8: the smart card gets an in-package identifier according to the constant pool entry array current element, and gets an in-package class virtual machine identifier;

in the embodiment, content stored in the address which is pointed at by the in-package class identifier is the in-package class virtual machine identifier;

step 72-9: the smart card gets a reference table index array element according to the in-package class virtual machine identifier;

in the embodiment, the in-package class virtual machine identifier points at the address of the reference table index array element, the contents stored in that are reference table index array elements;

step 72-10: the smart card gets an in-package class reference identifier according to the reference table index array element;

in the embodiment, the reference table index array element is the offset address of the in-package class reference identifier in class component;

step 72-11: the smart card gets the size of the in-package class instance according to the in-package class reference identifier, and writes it into the constant pool entry array to replace the current element, and executes step 709;

preferably, in the embodiment, the third byte of the offset address which is pointed at by the in-package class reference identifier means the size of the in-package class instance;

when the type of the constant pool entry array current element is a super class method reference, procedure includes:

step 73-1: the smart card determines whether the most significant digit of the constant pool entry array current element is 1, if yes, executing step 73-2, if no, executing step 73-8;

in the embodiment, when the type of the current element of the constant pool entry array is a super class method reference, that the most significant digit is 1 means the super class method is defined in an importing package, and the current element of the constant pool entry array contains an importing package identifier; that the most significant digit is 0 means the super class method is defined an in-package, and the constant pool entry array current element contains an in-package super class identifier;

step 73-2: the smart card gets an importing package identifier through the current element of the constant pool entry array, and gets importing package serial number;

step 73-3: the smart card gets the importing package super class identifier according to the importing package serial number;

in the embodiment, the content stored in the address which is pointed at by the importing package serial number is the importing package super class identifier when type of the current element of the constant pool entry array is a super class method reference;

step 73-4: the smart card gets the importing package super class virtual machine identifier in accordance with the importing package super class identifier;

in the embodiment, the importing package super class virtual machine identifier stored in the address which is pointed at by importing package super class identifier;

step 73-5: the smart card gets the method table cardinality in accordance with the importing package super class virtual machine identifier;

in the embodiment, the content stored in the address which is pointed at by the importing package super class virtual machine identifier is a method table, from which getting a method table cardinality;

step 73-6: the smart card determines whether the method table cardinality is less than the importing package super class identifier; if yes, executing step 73-7; if no, executing step 73-8;

step 73-7: the smart card gets an importing package super class method virtual machine identifier from the method table, and writes it into the constant pool entry array to replace the current element, and executes step 709;

in the embodiment, the method table contains an importing package super class virtual machine identifier;

step 73-8: the smart card gets a super class identifier of an importing package super class which corresponds to the current importing package super class identifier, and determines the super class identifier is an illegal identifier, if yes, executing step 709, if no, replacing the current importing package super class identifier with the super class identifier, and returning to step 73-4;

step 73-9: the smart card gets an in-package super class identifier in accordance with the current element of the constant pool entry array, and gets an in-package super class virtual machine identifier;

in the embodiment, when the type of the current element of the constant pool entry array is a super class method reference, the address which is pointed at by the in-package super class identifier stores the in-package super class virtual machine identifier;

step 73-10: the smart card gets an in-package super class method identifier in accordance with the in-package super virtual machine identifier;

in the embodiment, the address which is pointed at by the in-package super class virtual machine identifier stores the in-package super class method identifier;

step 73-11: the smart card gets an in-package super class method virtual machine identifier in accordance with the in-package super class method identifier, and writes it into the constant pool entry array to replace the current element, and executes step 709;

in the embodiment, the address which is pointed at by the in-package super class method identifier stores an in-package super class method virtual machine identifier;

when the type of the current element of the constant pool entry array is a static field reference, the process includes:

step 74-1: the smart card determines whether the most significant digit of the current element of the constant pool entry array is 1, if yes, executing step 74-2; if no, executing step 74-5;

in the embodiment, when the type of the current element of the constant pool entry array is a static field reference, that the most significant digit is 1 means the static field is defined in the importing package, and the current element of the constant pool entry array contains importing package identifier; that the most significant digit is 0 means the static field is defined in-package, and the current element of the constant pool entry array contains an in-package static field identifier;

step 74-2: the smart card gets an importing package identifier through the current element of the constant pool entry array, and gets an importing package serial number according to the identifier;

in the embodiment, the address which is pointed at by the in-package static field identifier stores the in-package static field virtual machine identifier;

step 74-3: the smart card gets an importing package static field identifier in accordance with the importing package serial number;

in the embodiment, the address which is pointed at by the importing package serial number stores the importing package static field identifier;

step 74-4: the smart card gets an importing package static field virtual machine identifier in accordance with the importing package static field identifier, and writes it into the constant pool entry array to replace the current element, and executing step 709;

in the embodiment, the address which is pointed at by the importing package static field identifier stores the importing package static field virtual machine identifier;

step 74-5: the smart card gets an in-package static field identifier in accordance with the current element of the constant pool entry array, and gets an in-package static field virtual machine identifier which was written into the constant pool entry array to replace the current element, and executes step 709;

when the type of the current element of the constant pool entry array is a static field method reference, the process includes:

step 75-1: the smart card determines whether the most significant digit of the current element of the constant pool entry array is 1, if yes, executing step 75-1; if no, executing step 75-5;

in the embodiment, when the current element of the constant pool entry array is a static method reference, that the most significant digit is 1 means the static method is defined in an importing package, and the constant pool entry array current element contains the importing package identifier; that the most significant is 0 means the static method is defined in a package, and the constant pool entry array current element contains the in-package static method identifier;

step 75-2: the smart card gets the importing package identifier according to the constant pool entry array current element, and gets an importing package serial number according to the importing package identifier;

step 75-3: the smart card gets the importing package static method identifier according to the importing package serial number;

in the embodiment, when the type of the constant pool entry array current element is a static method reference, the address which is pointed at by the importing package serial number stores the importing package static method identifier;

step 75-4: the smart card gets the importing package static method virtual machine identifier according to the importing package static method identifier, and writes it into the constant pool entry array to replace the current element, and executes step 709;

in the embodiment, the address which is pointed at by the importing package static method identifier stores the importing package static method virtual machine identifier;

step 75-5: the smart card gets an in-package static method identifier and an in-package static method virtual machine identifier in accordance with the constant pool entry array current element, and writes the in-package static method virtual machine identifier into the constant pool entry array to replace the current element, and executes step 709;

in the embodiment, the address which is pointed at by the in-package static method identifier stores the in-package static method virtual machine identifier;

step 709: the smart card makes decrement to the count value of the third counter;

in the embodiment, after the smart card makes decrement to the count value of the third counter, the count value means the number of unparsed elements in the constant pool entry array;

step 710: the smart card determines whether the count value of the third counter equals 0, if yes, executing step 711; if no, executing step 707;

step 711: the smart card clears memory space occupied by the constant pool component;

Embodiment 4

Figure 8:
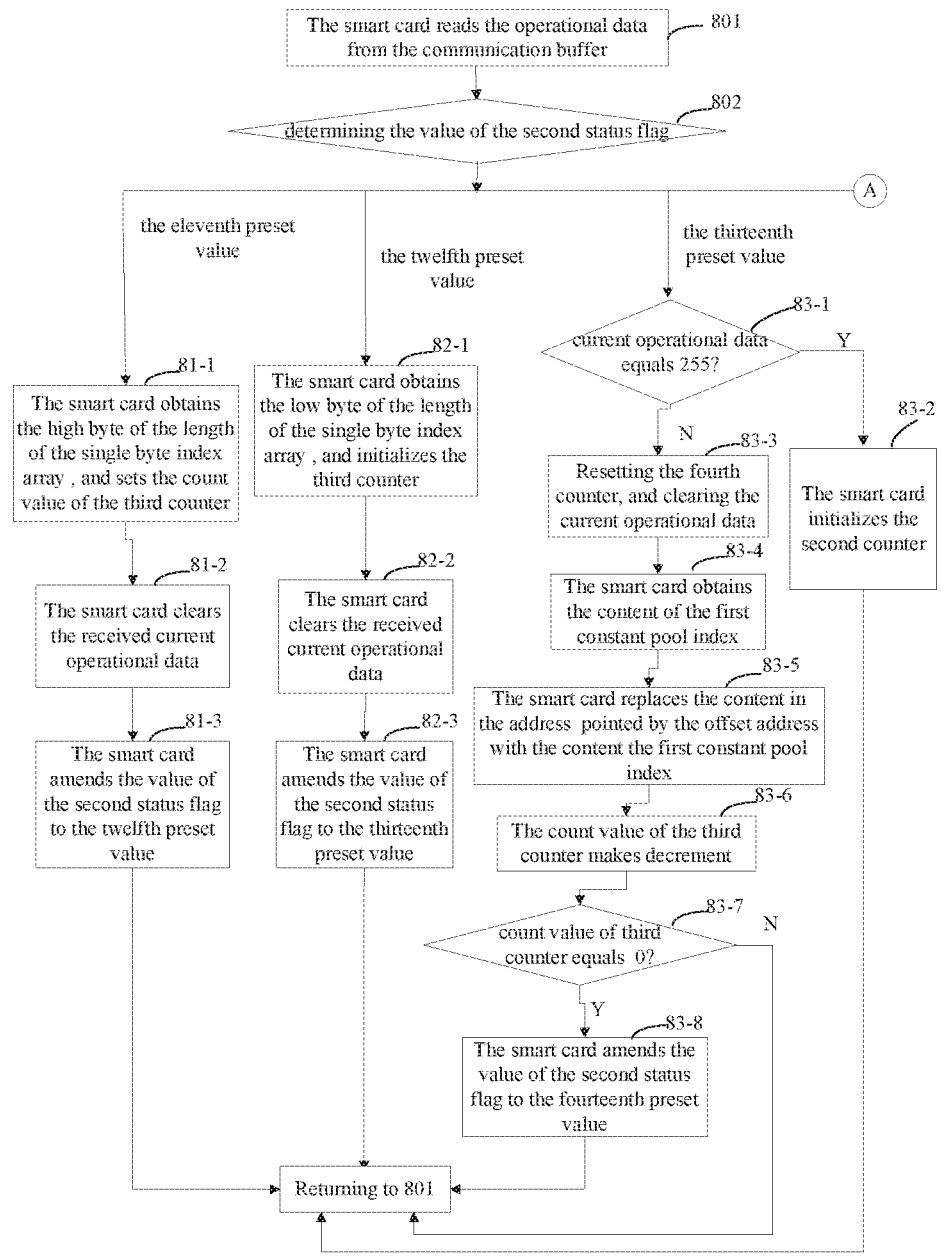
FIG. 8 is a flowchart of a method for downloading and parsing the reference location component by the smart card according to embodiment 4 of the disclosure.

The embodiment 4 provides a method for downloading and parsing a reference location component by a smart card, more details see FIG. 8, which includes:

step 801: the smart card reads the reference location component data from the communication buffer;

in the embodiment, the reference location component operational data contains: the high byte of the number of single byte index array elements, the low byte of the number of single byte index array elements, single byte index array elements, the high byte of the number of double byte index array elements, the low byte of the number of double byte index array elements, double byte index array elements;

step 802: the smart card determines the value of the second status flag, and executes correspondingly according to different values;

in the embodiment, the value of the second status flag contains: the eleventh preset value, the twelfth preset value, the thirteenth preset value, the fourteenth preset value, the fifteenth preset value, and sixteenth preset value;

preferably, in the embodiment, the eleventh preset value of the second status flag is 0; the twelfth preset value of the second status flag is 1; the thirteenth preset value of the second status flag is 2; the fourteenth preset value of the second status flag is 3; the fifteenth preset value of the second status flag is 4; the sixteenth preset value of the second status flag is 5;

The first situation when the value of the second status flag is the eleventh preset value, the procedure includes following steps:

step 81-1: the smart card gets the high byte of the number of the single byte index array elements in accordance with the operational data, and sets the count value of the third counter to the high byte;

in the embodiment, the third counter is used for metering the number of the single byte index array elements;

step 81-2: the smart card clears the current operational data of the reference location array;

step 81-3: the smart card amends the value of the second status flag to the twelfth preset value, and returns to step 801;

when the value of the second status flag is the twelfth preset value, the procedure includes following steps:

step 82-1: the smart card gets the low byte of the length of the single byte index array, and resets the third counter;

in the embodiment, the process of the smart card resetting the third counter includes: the smart card adds the value which gets by shifting left the count value of the third counter and the low byte of the number of the single byte index array elements together;

step 82-2: the smart card clears the current data of the reference location component;

step 82-3: the smart card amends the value of the second status flag to the third preset value, and returns to step 801;

when the value of the second status flag is the third preset value, the procedure includes:

step 83-1: the smart card determines whether the current operational data equals 255, if yes, executing step 83-2; if no, executing step 83-3;

in the embodiment, the value of the operational data ranges from 0 to 255; when the smart card at the status of the single byte index array, the operational data received contains a single byte index array element which is the offset address of the first constant pool index in the method component;

step 83-2: the smart card resets the fourth counter and returns to step 401;

in the embodiment, the fourth counter is used for metering the offset addresses of the first constant pool index and the second constant pool index respectively in the method component; that the smart card initializes the fourth counter includes: the smart card adds the current value of the fourth counter and 255 together;

step 83-3: the smart card sets the value of the fourth counter to the sum of the current value of the fourth counter and the value of the current operational data, and clears the current operational data of the reference location component;

step 83-4: the smart card gets the content of the constant pool index in accordance with the offset address of the first constant pool index in the method component;

in the embodiment, the smart card gets the content of the first constant pool index according to the address of the first constant pool index stored in the address which is pointed at by the offset address of the first constant pool index in the method component;

step 83-5: the smart card replaces the content in the address which is point at by the offset address of the first constant pool index in the method component with the content of the first constant pool index;

step 83-6: the smart card makes decrement to the third counter;

in the embodiment, after the smart card makes decrement to the third counter, the value of the third counter means the number of the unparsed element in the single byte index array;

step 83-7: the smart card determines whether the count value of the third counter equals 0, if yes, executing step 83-8; if no, returning to step 801;

step 83-8: the smart card amends the value of the second status flag to the fourteenth preset value, and returns to step 801;

when the value of the second status flag is the fourteenth preset value, the procedure includes:

step 84-1: the smart card gets the high byte of the number of the double byte index array elements, and sets the third counter to the high byte of the single byte index array element;

step 84-2: the smart card clears the current operational data of the reference location component;

step 84-3: the smart card amends the value of the second status flag to the fifteenth preset value, and returns to step 801;

when the value of the second status flag is the fifteenth preset value, procedure includes:

step 85-1: the smart card resets the third counter;

in the embodiment, the smart card resets the third counter as following: the smart card adds the value which gets by shifting the value of the third counter left by eight bits and the low byte of the length of the double byte index array together;

step 85-2: the smart card clears the operational data of the reference location component;

step 85-3: the smart card amend the value of the second status flag to the sixteenth preset value, and returns to step 801;

when the value of the second status flag is sixteenth preset value, the procedure includes:

step 86-1: the smart card determines whether the value of the current operational data equals 255, if yes, executing step 86-2; if no, executing step 86-3;

in the embodiment, the value of the operational data ranges from 0 to 255; when the smart card is at the status of the double byte index array, the operational data received contains double byte index array element which is the offset address of the second constant pool index in the method component;

step 86-2: the smart card initializes the fourth counter, and returns to step 801;

in the embodiment, the smart card initializes the fourth counter as following: the smart card adds the current count value of the fourth counter and 255 together;

step 86-3: the smart card sets the count value of the fourth counter to the sum of the current count value of the fourth counter and the current operational data, and clears received operational data;

step 86-4: the smart card gets the content of the second constant pool index in accordance with the offset address of the second constant pool index in the method component;

in the embodiment, the address which is pointed at by the offset address of the second constant pool index in the method component stores the second constant pool index address, the smart card gets the content of the second constant pool index according to the address of the second constant pool index;

step 86-5: the smart card replaces the content stored in the address which is pointed at by the offset address of the second constant pool index in the component with the content of the second constant pool index;

step 86-6: the smart card makes decrement to the count value of the third counter;

in the embodiment, after the smart card makes decrement to the count value of the third counter, the count value of the third counter means the number of the unparsed elements in the double byte index array;

step 86-7: the smart card determines whether the count value of the third counter equals 0, if yes, the procedure of downloading and parsing the reference location component is finished; if no, executing step 801.

Steps in the method for the present disclosure can be also used for Java card and other types of smart card.

While all above are preferred embodiments of the present disclosure, protective scope of the disclosure is not limited to hereof, variations and changes which can be made by those skilled in the art easily fall in scope of the disclosure. It is intended that the following claims defined the scope of the disclosure and that method and structures within the scope of these claims and their equivalents be covered thereby.

The invention claimed is:

1. A method for processing a CAP document by a smart card, comprising:
   A. establishing a connection between the smart card and an external terminal and initializing;
   B. receiving, by the smart card, an Application Protocol Data Unit, APDU, command corresponding to the CAP document, and storing the data comprised in the APDU command into a communication buffer;
   C. determining, by the smart card, a value of a first status flag in the smart card, executing step D in a case that the value is a first preset value; executing step E in a case that the value is a second preset value; executing step F in a case that the value is a third preset value; executing step G in a case that the value is a fourth preset value; executing step H in a case that the value is a fifth preset value; executing step I in a case that the value is a sixth preset value; executing step J in a case that the value is a seventh preset value; executing step K in a case that the value is an eighth preset value; executing step L in a case that the value is a ninth preset value; and executing step M in a case that the value is a tenth preset value;
   D. reading, by the smart card, a header component data of the APDU command from the communication buffer; processing, by the smart card, unprocessed header component data when a size of the header component data read but unprocessed by the smart card matches size information comprised in the header component data read by the smart card; when the smart card does not read all data in the header component, and there is no unread data in the communication buffer, returning to step B; amending, by the smart card, the first status flag to the second preset value when all the header component data are processed by the smart card, and determining whether there is unread data in the communication buffer, if yes, returning to step C; if no, returning to step B;
   E. reading, by the smart card, a directory component data of the APDU command from the communication buffer; when the size of the directory component data read but unprocessed by the smart card matches size information comprised in the directory component data read by the smart card, processing, by the smart card, the unprocessed data; when the smart card does not read all data included in the directory component and there is no unread data in the communication buffer, returning to step B; amending, by the smart card, the first status flag to the third preset value when all the directory component data are processed by the smart card, and determining whether there is unread data in the communication buffer, if yes, returning to step C; if no, returning to step B;
   F. reading, by the smart card, an applet component data of the APDU command from the communication buffer; processing, by the smart card, unprocessed data when the size of the applet component data read but unprocessed by the smart card matches size information comprised in the applet component data read by the smart card; when the smart card does not read all applet component data included in the applet component, returning to step B; when the smart card has processed all applet component data included in the applet component, amending, by the smart card, value of the first status flag to the fourth preset value, and determining whether there is unread data in the communication buffer, if yes, returning to step C; if no, returning to step B;

G. reading, by the smart card, an importing component data of the APDU command from the communication buffer; processing, by the smart card, unprocessed data when the size of the importing component data read but unprocessed by the smart card matches size information comprised in the importing component data read by the smart card; when the smart card does not read all importing component data included in the importing component and there is no unread data in the communication buffer, returning to step B; when the smart card has processed all importing component data included in the importing component, amending, by the smart card, the value of the first status flag to the fifth preset value, and determining whether there is unread data in the communication buffer, if yes, returning to step C, if no, returning to step B;

H. reading, by the smart card, a class component data of the APDU command from the communication buffer; when the smart card has read all class component data, and there is no unread data in the communication buffer, returning to step B; processing, by the smart card, the class component when all class component data included in the class component are read by the smart card, and amending the value of the first status flag to the sixth preset value, and determining whether there is unread data in the communication buffer, if yes, returning to step C; if no, returning to step B;

I. reading, by the smart card, a method component data of the APDU command from the communication buffer; when the smart card does not read all method component data included in the method component, and there is no unread data in the communication buffer, returning to step B; amending, by the smart card, the value of the first status flag to the seventh preset value when the smart card has read all method component data included in the method component, and determining whether there is unread data in the communication buffer, if yes, returning to step C, if no, returning to step B;

J. reading, by the smart card, a static field component data of the APDU command from the communication buffer; processing, by the smart card, the unprocessed static field component data when the size of the static field data read but unprocessed by the smart card matches size information comprised in the static field component data read by the smart card; when the smart card does not read all static field component data included in the static field component, and there is no unread data in the communication buffer, returning to step B; when the smart card has processed all static field component data included in the static field component, amending, by the smart card, the value of the first status flag to the eighth preset value, and determining whether there is unread data in the communication buffer, if yes, returning to step C, if no, returning to step B;

K. reading, by the smart card, an export component data of the APDU command from the communication buffer; when the smart card does not read all export component data included in the export component, and there is no unread data in the communication buffer, returning to step B; when the smart card has read all export component data included in the export component, processing, by the smart card, the export component, and amending the value of the first status flag to the ninth preset value, and determining whether there is unread data in the communication buffer, if yes, returning to step C, if no, returning to step B;

L. reading, by the smart card, a constant pool component data of the APDU command from the communication buffer; when the smart card does not read all constant pool component data included in the constant pool component, and there is no unread data in the communication buffer, returning to step B; when the smart card has read all constant pool component data included in the constant pool component, processing, by the smart card, the constant pool component, and amending value of the first status flag to the tenth preset value, and determining whether there is unread data in the communication buffer, if yes, returning to step C, if no, returning to step B;

M. reading, by the smart card, a reference location component data of the APDU command from the communication buffer; processing, by the smart card, the unprocessed reference location component data when the size of the reference location component data read but unprocessed by the smart card matches size information comprised in the reference location component data read by the smart card; when the smart card does not read all reference location component data included in the reference location component, and there is no unread data in the communication buffer, returning to step B; when the smart card has processed all reference location component data included in the reference location component, ending the method.

2. The method according to claim 1, wherein before processing, by the smart card, the constant pool component, the method further comprises:

obtaining, by the smart card, size information of the constant pool component from the directory component, and determining whether a size of the constant pool component is larger than available memory space of a random access memory, if yes, allocating a space in a non-volatile memory for the constant pool component according to the size of constant pool component; if the size is not larger than the available memory space, allocating a space in the random access memory for the constant pool component according to the size of constant pool component;

processing, by the smart card, the constant pool component, comprising:
    storing, by the smart card, the constant pool component into the space which is allocated for the constant pool component; and
    updating, by the smart card, constant pool entry array elements in the constant pool component.

3. The method according to claim 2, wherein before updating the constant pool component by the smart card, the method further comprises:

obtaining, by the smart card, the number of elements of the constant pool entry array from the constant pool component, and setting a count value of a first counter as the number of elements of the constant pool entry array;

updating, by the smart card, the constant pool entry array elements in the constant pool component, comprising following steps:
    step a, obtaining, by the smart card, an unparsed constant pool entry array element from the constant pool component, and determining a type of the current element according to the label of the current element; if the element is a class reference, executing step b; if the element is an instance reference, executing step c; if the element is a super class reference, executing step d; if the element is a virtual method reference, executing step f; if the element is a static field reference, executing step j; if the element is a static reference, executing step k;

step b, determining, by the smart card, whether the most significant digit of the current element is 1; if the digit is 1, obtaining an importing package indicator in accordance with the current element, then obtaining an importing package serial number in accordance with the importing package indicator, and then obtaining an importing package class indicator according to the importing package serial number, then obtaining an importing package class virtual machine indicator according to the importing package class indicator, and then replacing the current element included in the constant pool entry array with the importing package class virtual machine indicator, and executing step m;

if the most significant digit is not 1, obtaining, by the smart card, an in-package class indicator according to the current element, and then obtaining an in-package class virtual machine indicator according to the in-package indicator, and then replacing the current element included in the constant pool entry array with the in-package class virtual machine indicator and executing step m;

step c, determining, by the smart card, whether the most significant digit of the current element is 1, if the digit is 1, obtaining, by the smart card, an importing package indicator according to the current element, then obtaining an importing package serial number according to the importing package indicator, and then obtaining an importing package class instance indicator according to the importing package serial number, and then obtaining an importing package class virtual machine indicator according to the importing package class instance indicator, and then obtaining a reference list index array element according to the importing package class virtual machine indicator, and then obtaining an importing package class reference indicator according to the reference list index array element, and then obtaining size information of the importing package class instance according to the importing package class reference indicator, and then replacing the current element in the constant pool list array with the size information of the importing package class instance and executing step m;

if the most significant digit is not 1, obtaining, by the smart card, an in-package class indicator according to the current element, and then obtaining an in-package class virtual machine indicator according to the in-package class indicator, and then obtaining a reference list index array element according to in-package class virtual machine indicator, and then obtaining an in-package class reference indicator according to the reference list index array element, and then obtaining size information of the in-package class instance according to the in-package class reference indicator, and then replacing the current element in the constant pool entry array with the size information of the in-package class instance, and executing step m;

if the most significant digit is not 1, obtaining, by the smart card, an in-package class instance indicator according to the current element, and then obtaining an in-package class instance virtual machine indicator according to the in-package class instance indicator, and then obtaining a reference list index array element according to the in-package class instance virtual machine indicator, and then obtaining an in-package class instance reference indicator according to the reference list index array element, and then obtaining size information of the in-package class instance according to the in-package class instance reference indicator, and then replacing the current element in the constant pool entry array with the size information of the in-package class instance, and executing step m;

step d, determining, by the smart card, whether the most significant digit of the current element is 1, if the digit is 1, then executing step e; if the digit is not 1, then executing step f;

step e, obtaining, by the smart card, an in-package super class indicator according to the current element, and then obtaining an in-package super class virtual machine indicator according to the in-package super class indicator, and then obtaining an in-package super class method indicator according to the in-package super class virtual machine indicator, and then obtaining an in-package super class method virtual machine indicator according to the in-package super class method indicator, and then replacing the current element in the constant pool entry array with the in-package super class method virtual machine indicator, and executing step m;

step f, obtaining, by the smart card, an importing package indicator and a method indicator according to the current element, and obtaining an importing package serial number according to the importing package indicator, and then obtaining a current importing package super class indicator according to the importing package serial number;

step g, obtaining, by the smart card, the importing package super class virtual machine indicator according to the current importing package super class indicator, and then obtaining a method table according to the importing package super class virtual machine indicator, and obtaining a method table cardinality according to the method table, and determining whether the method cardinality is not larger than the method indicator, if the method cardinality is not larger than the method indicator, executing step h; if it is larger than the method indicator, executing step i;

step h, obtaining, by the smart card, an importing package super class method virtual machine indicator from the method table, and replacing the current element in the constant pool entry array with the importing package super class method virtual machine indicator, and executing step m;

step i, obtaining, by the smart card, a corresponding importing package super class according to the current importing package super class indicator, and obtaining a super class indicator of the importing package super class from the importing package super class, and determining whether the super class indicator of the importing package super class is an illegal indicator, if yes, returning to step m; if no, replacing the current importing package super class indicator with the super class indicator of the importing package super class, and returning to step g;

step j, determining, by the smart card, whether the most significant digit of the current element is 1, if yes, obtaining, by the smart card, an importing package indicator according to the current element, and then obtaining an importing package serial number according to the importing package indicator, and then obtaining an importing package static field indicator according to the importing package serial number, and then obtaining an importing package static field virtual machine indicator according to the static field indicator of the importing package, and replacing the current element in the constant pool entry array with the static field virtual machine indicator of the importing package, and executing step m;

if the most significant digit is not 1, obtaining an in-package static field indicator according to the current element, and obtaining an in-package static field virtual machine indicator according to the in-package static field indicator, and then replacing the current element in the constant pool entry array with the in-package static field virtual machine indicator, and executing step m;

step k, determining, by the smart card, whether the most significant digit of the current element is 1, if yes, obtaining, by the smart card, an importing package indicator according to the current element, and obtaining an importing package serial number according to the importing package indicator, and then obtaining an importing package static method indicator according to the serial number of importing package, and obtaining an importing package static method virtual machine indicator according to the importing package static method indicator, and replacing the current element in the constant pool entry array with the importing package static method virtual machine indicator, and executing step m;

if the most significant digit is not 1, obtaining, by the smart card, an in-package static method indicator according to the current element, and then obtaining an in-package static method virtual machine indicator according to the in-package static method indicator, and then replacing the current element in the constant pool entry array with the in-package static method virtual machine indicator, and executing step m;

step m, incrementing, by the smart card, the count value of second counter by 1, determining, by the smart card, whether the count value of the first counter is zero, if yes, clearing all memory space in the constant poor component except the space occupied by the constant pool entry array; if no, returning to step a.

4. The method according to claim 1, wherein processing, by the smart card, the reference location component data, comprises:

obtaining, by the smart card, an offset address of the constant pool index in the method component according to the reference location component data;

obtaining, by the smart card, the constant pool index according to the offset address, and then obtaining contents of the corresponding the constant pool entry array according to the constant pool index; and replacing, by the smart card, the constant pool index stored in the address which is pointed at by the offset address with the contents of the constant pool entry array.

5. The method as claimed as claim 4, wherein the constant pool index comprises first constant pool index and second constant pool index;

processing, by the smart card, the reference location component data, comprises:

I. determining, by the smart card, the value of second status flag, if the value is an eleventh preset value, executing step II; if the value is a twelfth preset value, executing step III; if the value is a thirteenth preset value, executing step IV; if the value is a fourteenth preset value, executing step V; if the value is a fifteenth preset value, executing step VI; if the value is a sixteenth preset value, executing step VII;

II. obtaining, by the smart card, the high byte of the number of elements of a single byte index array from the reference location component data, setting a count value of the second counter according to the high byte, amending the value of the second flag to the twelfth preset value, and returning to step I;

III. obtaining, by the smart card, the low byte of the number of elements of a single byte index array from the reference location component data, updating the count value of the second counter according to the low byte, and amending the value of the second flag to the thirteenth preset value, and returning to step I;

IV. obtaining, by the smart card, an unprocessed single byte index array element from the reference location component data, and obtaining an offset address of the first constant pool index in the method component, and obtaining contents of the corresponding the constant pool entry array according to the first constant pool index stored in the address which is pointed at by the offset address, and replacing the first constant pool index stored in the address which is pointed at by the offset address with the contents of the constant pool entry array, decrementing the count value of second counter by 1, determining, by the smart card, whether the count value of the second counter is 0, if the value is not 0, returning to step I; if the value is 0, amending the value of the second status flag to the fourteenth preset value, and returning to step I;

V. Obtaining, by the smart card, the high byte of the number of elements of a double-byte index array from the reference location component data, and setting a count value of the third counter in accordance with the high byte, and then amending the value of the second status flag to the fifth preset value, and returning step I;

VI. Obtaining, by the smart card, the low byte of the number of elements of a double-byte index array from the reference location component data, updating the count value of the third counter, and amending the value of the second flag to the sixteenth preset value, and returning to step I; and VII. Obtaining, by the smart card, an unprocessed double-byte index array element from the reference location component data, obtaining the offset address of the second constant pool index in the method component according to the double-byte index array element, obtaining contents of the corresponding the constant pool entry array in accordance with the second constant pool index stored in the address which is pointed at by the offset address, replacing the second constant pool index stored in the address which is pointed at by the offset address with the contents of the constant pool entry array, decrementing the count value of third counter by 1, and determining, by the smart card, whether the count value of the third counter equals 0, if the count value is not equal to 0, returning to step I; if the count value equals 0, ending the process of processing the reference location component.

6. The method according to claim 5, wherein obtaining, by the smart card, an unprocessed single-byte index array element from the reference location component data, comprising:
   obtaining, by the smart card, unprocessed current operational data in a single-byte index array from the reference location component data, and determining whether the current operational data in the single-byte index array is less than 255, if the data is not less than 255, updating the count value of the fourth counter to the sum of the current number of the fourth counter and 255, and returning to step I; if the data is less than 255, updating the count value of the fourth counter to the sum of the current number of the fourth counter and the current operational data in the single-byte index array, and taking the count value of the fourth counter as the unprocessed single-byte index array element;
   obtaining, by the smart card, an unprocessed double-byte index array element from the reference location component data, comprising:
      obtaining, by the smart card, unprocessed current operational data from the reference location component data, and determining whether the current operational data in the double-byte index array is less than 255, if the data is not less than 255, updating the count value of the fifth counter to the sum of the current number of the fifth counter and 255, and returning to step I; if the data is less than 255, updating the count value of the fifth counter to the sum of the current number of the fifth counter and the current operational data in the double-byte index array, and taking the count value of the fifth counter as the unprocessed double-byte index array element.

7. A method for processing a CAP document by a smart card, comprising:
   A. establishing a connection between the smart card and an external terminal and initializing;
   B. receiving, by the smart card, the APDU command corresponding to the CAP document, and storing the data comprised in the APDU command into a communication buffer;
   C. determining, by the smart card, a state parameter in the APDU command, if a value of the state parameter is the first preset value, executing step D; if the value is the second preset value, executing step E; if the value is the third preset value, executing step F; if the value is the fourth preset value, executing step G; if the value is the fifth preset value, executing step H; if the value is the sixth preset value, executing step I; if the value is the seventh preset value, executing step J; if the value is the eighth preset value, executing step K; if the value is the ninth preset value, executing step L; if the value is the tenth preset value, executing step M;
   D. reading, by the smart card, a header component data of the APDU command from the communication buffer; processing, by the smart card, the unprocessed header component data when the size of the header component data read but unprocessed by the smart card matches size information comprised in the header component data read by the smart card; if the smart card does not read all header component data included in the header component, and there is not unread data in the communication buffer, returning to step B; if the smart card has processed all header component data included in the header component, returning to step B;
   E. reading, by the smart card, a directory component data of the APDU command from the communication buffer; processing, by the smart card, the unprocessed directory component data when the size of the directory component data read but unprocessed by the smart card matches size information comprised in the directory component data read by the smart card; if the smart card does not read all directory component data included in the directory component, and there is no unread data in the communication buffer, returning to step B; if the smart card has processed all header component data included in the directory component, returning to step B;
   F. reading, by the smart card, an applet component data of the APDU command from the communication buffer; processing, by the smart card, the unprocessed applet component when the size of the applet component data read but unprocessed by the smart card matches size information comprised in the applet component data read by the smart card; if the card does not read all applet component data included in the applet component, and there is not unread data in the communication buffer, returning to step B; if the smart card has processed all applet component data in the applet component, returning to step B;
   G. reading, by the smart card, an importing component data of the APDU command from the communication buffer; processing, by the smart card, the unprocessed import component data when the size of the importing component data read but unprocessed by the smart card matches size information comprised in the importing component data read by the smart card; if the smart card does not read all importing component data in the importing component, and there is no unread data in the communication buffer, returning to step B; if the smart card has processed all importing component data, returning to step B;
   H. reading, by the smart card, a class component data of the APDU command from the communication buffer; when the smart card does not read all class component data in the class component, and there is no unread data in the communication buffer, returning to step B; if the smart card has read all class component data in the class component, processing, by the smart card, the class component, and returning to step B;
   I. Reading, by the smart card, a method component data of the APDU command from the communication buffer; if the smart card does not read all method component data in the method component, and there is not unread data in the communication buffer, returning to step B; when the smart card has read all method component data in the method component, processing, by the smart card, the method component, and returning to step B;
   J. Reading, by the smart card, a static field component data of the APDU command from the communication buffer; processing, by the smart card, the unprocessed static field component data when the size of the static field component data read but unprocessed by the smart card matches size information comprised in the static field component data read by the smart card; if the smart card does not read all static field component data in the static field component, and there is no unread data in the communication buffer, returning to step B; if the smart card has processed all static field component data in the static field component, returning to step B;

K. Reading, by the smart card, an export component data of the APDU command from the communication buffer; if the smart card does not read all export component data included in the export component, and there is no unread data in the communication buffer, returning to step B; if the smart card has read all export component data in the export component, processing the export component by the smart card, and returning to step B;

L. Reading, by the smart card, a constant pool component data of the APDU command from the communication buffer; if the smart card does not read all constant pool component data included in the constant pool component, and there is no unread data in the communication buffer, returning to step B; when the smart card has read all constant pool component in the constant pool component, processing, by the smart card, the constant pool component, and returning to step B; and M. Reading, by the smart card, a reference location component data of the APDU command from the communication buffer; processing, by the smart card, the unprocessed reference location component data when the size of the reference location component data read but unprocessed by the smart card matches size information comprised in the reference location component data read by the smart card; if the smart card does not read all reference location component data in reference location component, and there is no unread data in communication buffer, returning to step B; when the smart card has processed all reference location component data included in the reference location component, ending the process.

8. The method according to claim 7, wherein before processing, by the smart card, the constant pool component, the method further comprises following steps:
obtaining, by the smart card, the size information of the constant pool component from the directory component, and determining whether the size of the constant pool component is larger than the available memory space of a random access memory, if yes, allocating memory space for the constant pool component in a nonvolatile memory according to the size of the constant pool component; if the size is not larger than the available memory space, allocating memory space for the constant pool in the random access memory according to the size of the constant pool component;
processing, by the smart card, the constant pool component, comprising:
storing, by the smart card, the constant pool component into the memory space which is allocated for the constant pool component;
updating, by the smart card, the constant pool entry array elements in the constant pool component.

9. The method according to claim 8, wherein before updating, by the smart card, the constant pool entry array elements in the constant pool component, the method further comprises following steps:
obtaining, by the smart card, the number of elements of the constant pool entry array from the constant pool component, and setting a count value of the first counter to the number of elements of the constant entry array;
updating, by the smart card, the constant pool entry array elements in the constant pool array, comprising:
step a, obtaining, by the smart card, an unparsed constant pool entry array element from the constant pool component, determined a type of the current element according to the current element label, if the current element is a class reference, executing step b; if the current element is an instance reference, executing step c, if the current element is a super class method reference, executing step d; if the current element is a virtual method reference, executing step f; if the current element is a static field reference, executing step I; if the current element is a static method reference, executing step k;
step b, determining, by the smart card, whether the most significant digit of the current element is 1, if yes, obtaining an importing package indicator in accordance with the current element, and obtaining an importing package serial number in accordance with the importing package indicator, and obtaining an importing package class indicator in accordance with the importing package serial number, and obtaining an importing package class virtual machine indicator in accordance with the importing package class indicator, and replacing the current element in the constant pool entry array with the importing package class virtual machine indicator, and executing step m; and
if the digit is not 1, obtaining, by the smart card, an in-package class indicator in accordance with the current element, obtaining an in-package class virtual machine indicator in accordance with the in-package class indicator, and replacing the current element in the constant pool entry array with the in-package class virtual machine, and executing step m;
step c, determining, by the smart card, whether the most significant digit of the current element is 1, if the digit is 1, obtaining an importing package indicator in accordance with the current element, and obtaining an importing package serial number in accordance with the importing package indicator, and obtaining an importing package class indicator in accordance with the importing package serial number, and obtaining an importing package class virtual machine indicator in accordance with the importing package class indicator, and obtaining a reference list index array element in accordance with the importing package class virtual machine indicator, and obtaining an importing package class reference indicator in accordance with the reference list index array element, and obtaining a piece of size information of importing package class instance in accordance with the importing package class reference indicator, and replacing the current element in the constant pool entry array with the size information of the importing package instance, and executing step m;
if the most significant digit is not 1, obtaining, by the smart card, an in-package class instance indicator in accordance with the current element, and obtaining an in-package class instance virtual machine indicator in accordance with the in-package class instance indicator, and obtaining a reference list index array element in accordance with the in-package instance virtual machine indicator, and obtaining an in-package class instance reference indicator in accordance with the reference list index array element, and obtaining a piece of size information of the in-package class instance reference in accordance with the in-package class reference indicator, and replacing the current element in the constant pool entry array with the size information of the in-package class instance reference, and executing step m;

step d, determining, by the smart card, whether the most significant digit of the current element is 1, if the digit is not 1, executing step e; if the digit is 1, then executing step f;

step e, obtaining, by the smart card, an in-package super class indicator in accordance with the current element, and obtaining an in-package super class virtual machine indicator in accordance with the in-package super class indicator, and obtaining an in-package super class method indicator in accordance with the in-package super class virtual machine indicator, and obtaining an in-package super class method virtual machine indicator in accordance with the in-package super class method indicator, and then replacing the current element in the constant pool entry array with the in-package super class method virtual machine indicator, and executing step m;

step f, obtaining, by the smart card, an importing package indicator and a method indicator in accordance with the current element, and obtaining an importing package serial number in accordance with the importing package indicator, and obtaining an importing package super class indicator in accordance with the importing package serial number;

step g, obtaining, by the smart card, the importing package super class virtual machine indicator in accordance with the current importing package super class indicator, and obtaining a method table in accordance with the importing package super class virtual machine indicator, and obtaining a method table cardinal number in accordance with the method table, and determining whether the method table cardinal number is not larger than the method indicator, if the number is less than the method indicator, executing step h; if the number is larger than the method indicator, executing step I;

step h, obtaining, by the smart card, an importing package super class method virtual machine indicator from the method table, and replacing the current element in the constant pool table with the importing package super class method virtual machine indicator, and executing step m;

step I, obtaining, by the smart card, a corresponding importing package super class in accordance with the current importing package super class indicator, and obtaining a super class indicator of the importing package super class from the importing package super class, and determining whether the super class indicator of the importing package super class is an illegal indicator, if yes, returning to step m; if no, replacing the current importing package super class indicator with the super class indicator of the importing package super class, and returning to step g;

step j, determining, by the smart card, the most significant digit of the current element is 1, if the digit is 1, obtaining an importing package indicator in accordance with the current element, and obtaining an importing package serial number in accordance with the importing package indicator, and obtaining an importing package static field indicator in accordance with the importing package serial number, and obtaining an importing package static field virtual machine indicator in accordance with the importing package static field indicator, and then replacing the current element in the constant pool entry array with the importing package static field virtual machine indicator, and executing step m;

if the most significant digit is not 1, obtaining, by the smart card, an in-package static field indicator in accordance with the current element, and obtaining an in-package static field virtual machine indicator in accordance with the in-package static field indicator, and then replacing the current element in the constant pool entry array with the in-package static field virtual machine, and executing step m;

step k, determining, by the smart card, whether the most significant digit of the current element is 1, if the digit is 1, obtaining an importing package indicator in accordance with the current element, and obtaining an importing package serial number according to the importing package indicator, and obtaining an importing package static method indicator in accordance with the importing package serial number, and obtaining an importing package static field method virtual machine indicator in accordance with the importing package static method indicator, and replacing the current element in the constant pool entry array with the importing package static method virtual machine indicator, and executing step m;

if the most significant digit is not 1, obtaining, by the smart card, an in-package static method indicator in accordance with the current element, and obtaining an in-package static method virtual machine indicator in accordance with the in-package static method indicator, and then replacing the current element in the constant pool entry array with the in-package static method virtual machine indicator, and executing step m; and step m, after the count value of the first counter minus 1, determining, by the smart card, whether the count value of the first counter is 0, if the value is 0, clearing all memory space in the constant poor component except the space occupied by the constant pool entry array; if the value is not 0, returning to step a.

10. The method according to claim 7, wherein processing, by the smart card, the reference location component data, comprises:

obtaining, by the smart card, the offset address of the constant pool index in the method component in accordance with the reference location component data;

obtaining, by the smart card, the constant pool index in accordance with the offset address, and obtaining contents of the corresponding the constant pool entry array in accordance with the constant pool index; and replacing, by the smart card, the constant pool index stored in the address which is pointed at by the offset address with the contents of the constant pool entry array.

11. The method according to claim 10, wherein the constant pool index comprises the first constant pool index and the second constant pool index;

processing, by the smart card, the reference location component data, comprises:

I. determining, by the smart card, the value of the second status flag, if the value of the second status flag is the eleventh preset value, executing step II; if the value of the second status flag is the twelfth preset value, executing step III; if the value of the second status flag is the thirteenth preset value, executing step IV; if the value of the second status flag is the fourteenth preset value, executing step V; if the value of the second status flag is the fifteenth preset value, executing step VI; if the value of the second status flag is the sixteenth preset value, executing step VII;

II. obtaining, by the smart card, the high byte of the number of elements of the single byte index array from the reference location component data, and setting a count value of the second counter according to the high byte, and amending the value of the second flag to the twelfth preset value, and returning to step I;

III. obtaining, by the smart card, the low byte of the number of elements of the single byte index array from the reference location component data, updating the count value of the second counter according to the low byte, and amending the value of the second flag to the thirteenth preset value, and returning to step I;

IV. obtaining, by the smart card, an unprocessed single byte index array element from the reference location component data, and obtaining the offset address of the first constant pool index in the method component in accordance with the single byte index array element, and obtaining contents of corresponding constant pool entry array in accordance with the first constant pool index stored in the address which is pointed at by the offset address, after the count value of the second counter minus 1, determining whether the count value of the second counter equals 0, if no, returning to step I; if yes, amending the value of the second flag to the fourteenth preset value, and returning to step I;

V. obtaining, by the smart card, the high byte of the number of elements of the double byte index array from the reference location component data, and setting a count value of the third counter according to the high byte, and amending the value of the second flag to the fifteenth preset value, and returning to step I;

VI. obtaining, by the smart card, the low byte of the number of elements of the double byte index array from the reference location component data, updating the count value of the third counter according to the low byte, and then amending the value of the second flag to the sixteenth preset value, and returning to step I;

VII. obtaining, by the smart card, an unprocessed double byte index array element from the reference location component data, and then obtaining the offset address of the second constant pool index in the method component in accordance with the double byte index array element, and obtaining contents of corresponding constant pool entry array in accordance with the second constant pool index stored in the address which is pointed at by the offset address, and then replacing the second constant pool index stored in the address which is pointed at by the offset address with the contents of the constant pool entry array, decrementing the count value of third counter by 1, the process determining whether the count value of the third counter equals 0, if no, returning to step I; if yes, ending the procedure of processing the reference location component.

12. The method according to claim 11, wherein obtaining, by the smart card, an unprocessed single byte index array element from the reference location component data, comprises:

obtaining, by the smart card, unprocessed current operational data in the single byte index array from the reference location component data, and determining whether the current operational data in the single byte index array is less than 255, if the data is not less than 255, then updating the count value of the fourth counter to the sum of the current count value of the fourth counter and 255, and returning to step I; if the data is less than 255, then updating the count value of the fourth counter to the sum of the current count value of the fourth counter and the current operational data in the single byte index array, and taking the count value of the fourth counter as the unprocessed single byte index array element;

obtaining, by the smart card, an unprocessed double byte index array element from the reference location component data, comprising:

obtaining, by the smart card, unprocessed current data in the double byte index array from the reference location component data, determining whether the current operational data in the double byte index array is less than 255, if the data is not less than 255, then updating the count value of the fifth counter to the sum of the current count value of the fifth counter and 255, and returning to step I; if the data is less than 255, updating the count value of the fifth counter to the sum of the current count value of the fifth counter and the current operational data in the double byte index array, and taking the count value of the fifth counter as the unprocessed double byte index array element.

* * * * *